(12) United States Patent
Silverstein et al.

(10) Patent No.: US 8,508,676 B2
(45) Date of Patent: Aug. 13, 2013

(54) PHASE-COMPENSATED ANTI-REFLECTIVE THIN FLIM COATING

(75) Inventors: Barry D. Silverstein, Rochester, NY (US); Andrew F. Kurtz, Macedon, NY (US); Jennifer D. Kruschwitz, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 13/588,504

(22) Filed: Aug. 17, 2012

(65) Prior Publication Data

US 2012/0307362 A1 Dec. 6, 2012

Related U.S. Application Data

(63) Continuation of application No. 12/616,156, filed on Nov. 11, 2009, now Pat. No. 8,305,502.

(51) Int. Cl.
*G02F 1/1335* (2006.01)
*G02F 1/13363* (2006.01)

(52) U.S. Cl.
USPC .......................................................... 349/8

(58) Field of Classification Search
USPC ................................. 349/8, 97, 106
See application file for complete search history.

(56) References Cited

U.S. PATENT DOCUMENTS

| | | | |
|---|---|---|---|
| 3,202,039 | A | 8/1965 | De Lang et al. |
| 4,373,782 | A | 2/1983 | Thelen |
| 4,701,028 | A | 10/1987 | Clerc et al. |
| 5,298,199 | A | 3/1994 | Hirose et al. |
| 5,576,854 | A | 11/1996 | Schmidt et al. |
| 5,579,159 | A | 11/1996 | Ito |
| 5,619,352 | A | 4/1997 | Koch et al. |
| 6,014,255 | A | 1/2000 | Van Der Wal et al. |

FOREIGN PATENT DOCUMENTS

WO WO0126384 * 4/2001

OTHER PUBLICATIONS

A. E. Rosenbluth et al., "Correction of Contrast in Projection Systems by Means of Phase-Controlled Prism Coatings and Band-Shifted Twist Compensators", SPIE Proc., vol. 3954, pp. 63-90, 2000.

* cited by examiner

*Primary Examiner* — Eric Wong
(74) *Attorney, Agent, or Firm* — Kevin E. Spaulding

(57) ABSTRACT

An anti-reflective thin film coating formed on an optical surface, comprising a multilayer thin-film stack arranged to suppress reflection of incident polarized light within an incident light wavelength range. The multilayer thin-film stack further provides a reflectance edge transition at a wavelength band that lies outside the incident light wavelength range. The reflectance edge transition is arranged to provide phase difference compensation to the polarized light within the incident polarized light wavelength range.

8 Claims, 38 Drawing Sheets

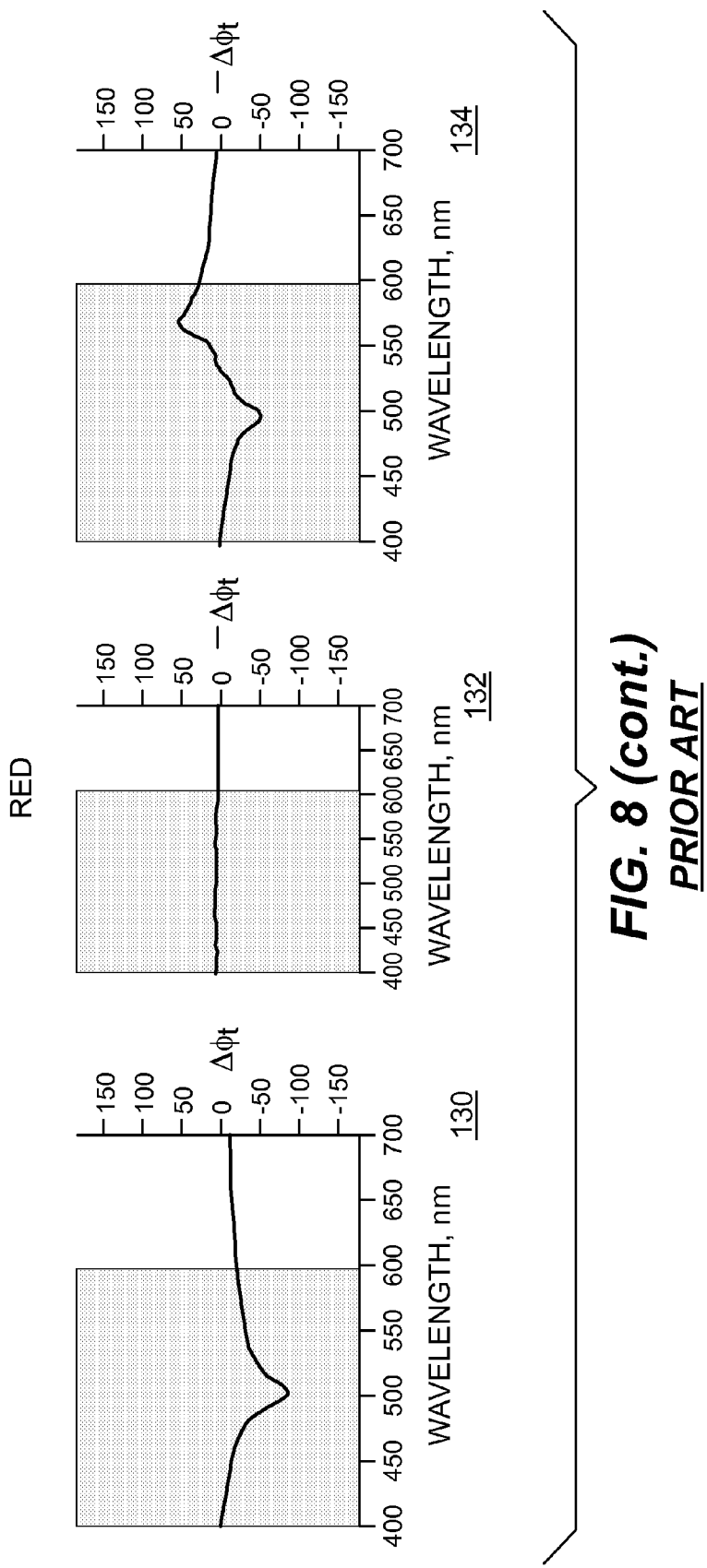
FIG. 8 (cont.) *PRIOR ART*

BLUE MIRROR

| LAYER | MATERIAL | PHYS. THK (nm) |
|---|---|---|
| 1 | A | 9.5 |
| 2 | L | 295.9 |
| 3 | A | 39.9 |
| 4 | L | 54.9 |
| 5 | A | 45.8 |
| 6 | L | 84.4 |
| 7 | A | 44.9 |
| 8 | L | 62.7 |
| 9 | A | 49.7 |
| 10 | L | 82.6 |
| 11 | A | 42.3 |
| 12 | L | 67.2 |
| 13 | A | 50.7 |
| 14 | L | 82.2 |
| 15 | A | 37.3 |
| 16 | L | 66.2 |
| 17 | A | 50.6 |
| 18 | L | 106.4 |
| 19 | A | 8.4 |

FIG. 17A

PHASE COMPENSATED AR COATING (HOT MIRROR)

| LAYER | MATERIAL | PHYS. THK (nm) |
|---|---|---|
| 1 | H | 12.0 |
| 2 | L | 19.4 |
| 3 | H | 33.2 |
| 4 | A | 41.8 |
| 5 | H | 37.3 |
| 6 | L | 16.9 |
| 7 | A | 2.3 |
| 8 | L | 125.4 |
| 9 | H | 2.9 |
| 10 | L | 11.8 |
| 11 | H | 24.0 |
| 12 | A | 49.7 |
| 13 | H | 29.7 |
| 14 | L | 135.1 |
| 15 | A | 5.2 |
| 16 | L | 13.5 |
| 17 | A | 65.7 |
| 18 | H | 25.6 |
| 19 | L | 136.2 |
| 20 | A | 5.7 |
| 21 | L | 12.0 |
| 22 | A | 65.8 |
| 23 | H | 23.1 |
| 24 | L | 135.7 |
| 25 | A | 5.1 |

FIG. 17B

PHASE COMPENSATED AR COATING (HOT MIRROR)

| LAYER | MATERIAL | PHYS. THK (nm) |
|---|---|---|
| 26 | L | 12.5 |
| 27 | A | 67.1 |
| 28 | H | 22.1 |
| 29 | L | 141.8 |
| 30 | H | 28.2 |
| 31 | A | 47.9 |
| 32 | H | 23.1 |
| 33 | L | 132.6 |
| 34 | A | 4.0 |
| 35 | L | 15.3 |
| 36 | A | 64.0 |
| 37 | H | 26.2 |
| 38 | L | 143.1 |
| 39 | H | 26.6 |
| 40 | A | 43.8 |
| 41 | H | 31.0 |
| 42 | L | 135.9 |
| 43 | A | 5.1 |
| 44 | L | 13.6 |
| 45 | A | 80.5 |
| 46 | L | 12.3 |
| 47 | A | 5.9 |
| 48 | L | 141.2 |
| 49 | A | 7.4 |
| 50 | L | 10.5 |
| 51 | A | 85.0 |
| 52 | L | 83.1 |

*FIG. 17B (cont.)*

| GREEN NOTCH LAYER | MATERIAL | PHYS. THK (nm) |
|---|---|---|
| 1 | B | 134.5 |
| 2 | L | 222.6 |
| 3 | B | 129.0 |
| 4 | L | 270.1 |
| 5 | B | 137.8 |
| 6 | L | 16.0 |
| 7 | B | 96.1 |
| 8 | L | 295.5 |
| 9 | B | 75.3 |
| 10 | L | 140.0 |
| 11 | B | 74.4 |
| 12 | L | 18.4 |
| 13 | B | 112.3 |
| 14 | L | 106.5 |
| 15 | B | 84.4 |
| 16 | L | 113.1 |
| 17 | B | 84.4 |
| 18 | L | 39.4 |
| 19 | B | 104.2 |
| 20 | L | 106.5 |
| 21 | B | 79.0 |
| 22 | L | 100.1 |
| 23 | B | 76.9 |
| 24 | L | 99.7 |
| 25 | B | 103.6 |
| 26 | L | 53.1 |
| 27 | B | 97.8 |
| 28 | L | 78.6 |
| 29 | B | 86.8 |
| 30 | L | 117.6 |
| 31 | B | 84.7 |
| 32 | L | 104.4 |
| 33 | B | 40.3 |
| 34 | L | 43.5 |
| 35 | B | 149.3 |

*FIG. 17C*

| BLUE MIRROR LAYER | MATERIAL | PHYS. THK (nm) |
|---|---|---|
| 1 | A | 9.5 |
| 2 | L | 295.9 |
| 3 | A | 39.9 |
| 4 | L | 54.9 |
| 5 | A | 45.8 |
| 6 | L | 84.4 |
| 7 | A | 44.9 |
| 8 | L | 62.7 |
| 9 | A | 49.7 |
| 10 | L | 82.6 |
| 11 | A | 42.3 |
| 12 | L | 67.2 |
| 13 | A | 50.7 |
| 14 | L | 82.2 |
| 15 | A | 37.3 |
| 16 | L | 66.2 |
| 17 | A | 50.6 |
| 18 | L | 106.4 |
| 19 | A | 8.4 |

FIG. 18A

PHASE COMPENSATED AR COATING (UV MIRROR)

| LAYER | MATERIAL | PHYS. THK (nm) |
|---|---|---|
| 1 | A | 5.8 |
| 2 | L | 66.4 |
| 3 | A | 19.2 |
| 4 | L | 50.0 |
| 5 | A | 39.1 |
| 6 | L | 25.6 |
| 7 | A | 59.1 |
| 8 | L | 33.9 |
| 9 | A | 28.6 |
| 10 | L | 95.5 |
| 11 | A | 14.6 |
| 12 | L | 60.0 |
| 13 | A | 129.8 |
| 14 | L | 65.8 |
| 15 | A | 15.1 |
| 16 | L | 70.1 |
| 17 | A | 121.2 |
| 18 | L | 201.6 |
| 19 | A | 116.4 |
| 20 | L | 201.9 |
| 21 | A | 116.3 |
| 22 | L | 201.8 |
| 23 | A | 116.3 |
| 24 | L | 201.3 |
| 25 | A | 115.8 |
| 26 | L | 206.5 |

*FIG. 18B*

PHASE COMPENSATED AR COATING (UV MIRROR)

| LAYER | MATERIAL | PHYS. THK (nm) |
|---|---|---|
| 27 | A | 47.0 |
| 28 | L | 16.4 |
| 29 | A | 48.0 |
| 30 | L | 80.3 |
| 31 | A | 11.8 |
| 32 | L | 83.2 |
| 33 | A | 42.4 |
| 34 | L | 27.0 |
| 35 | A | 39.6 |
| 36 | L | 94.6 |
| 37 | A | 8.5 |
| 38 | L | 75.9 |
| 39 | A | 117.0 |
| 40 | L | 196.8 |
| 41 | A | 112.7 |
| 42 | L | 196.1 |
| 43 | A | 111.2 |
| 44 | L | 191.6 |
| 45 | A | 107.5 |
| 46 | L | 189.1 |
| 47 | A | 38.3 |
| 48 | L | 4.0 |
| 49 | A | 61.9 |
| 50 | L | 93.9 |

*FIG. 18B (cont.)*

| GREEN NOTCH LAYER | MATERIAL | PHYS. THK (nm) |
|---|---|---|
| 1 | B | 134.5 |
| 2 | L | 222.6 |
| 3 | B | 129.0 |
| 4 | L | 270.1 |
| 5 | B | 137.8 |
| 6 | L | 16.0 |
| 7 | B | 96.1 |
| 8 | L | 295.5 |
| 9 | B | 75.3 |
| 10 | L | 140.0 |
| 11 | B | 74.4 |
| 12 | L | 18.4 |
| 13 | B | 112.3 |
| 14 | L | 106.5 |
| 15 | B | 84.4 |
| 16 | L | 113.1 |
| 17 | B | 84.4 |
| 18 | L | 39.4 |
| 19 | B | 104.2 |
| 20 | L | 106.5 |
| 21 | B | 79.0 |
| 22 | L | 100.1 |
| 23 | B | 76.9 |
| 24 | L | 99.7 |
| 25 | B | 103.6 |
| 26 | L | 53.1 |
| 27 | B | 97.8 |
| 28 | L | 78.6 |
| 29 | B | 86.8 |
| 30 | L | 117.6 |
| 31 | B | 84.7 |
| 32 | L | 104.4 |
| 33 | B | 40.3 |
| 34 | L | 43.5 |
| 35 | B | 149.3 |

*FIG. 18C*

PHASE-COMPENSATED ANTI-REFLECTIVE THIN FLIM COATING

CROSS REFERENCE TO RELATED APPLICATIONS

This is application is a continuation of U.S. patent application Ser. No. 12/616,156 filed Nov. 11, 2009, now U.S. Pat. No. 8,305,502 which is incorporated herein by reference in its entirety.

Reference is made to commonly-assigned co-pending U.S. Pat. No. 7,926,951 issued Apr. 29, 2011, entitled "Laser Illuminated Micro-Mirror Projector", by Silverstein et al., the disclosure of which is incorporated herein by reference.

FIELD OF THE INVENTION

The present invention generally relates to wavelength-selective optics formed from multilayer thin-film optical coatings and more particularly relates to an arrangement of optical coatings and a method for providing a set of optical coatings having a more uniform response to light having different polarization states.

BACKGROUND OF THE INVENTION

Electronic projection systems have been developed or commercialized using a wide range of modulation technologies. The various light modulation approaches used include deflection, diffraction, blocking or absorption, scattering, and rotation of polarization states, for example. Imaging devices using Liquid Crystal Devices (LCDs), for example, directly modulate the polarization state of incident light within each color channel in a pixel-by-pixel fashion. Imaging devices that use digital micro-mirror devices, include Digital Light Processor (DLP) devices from Texas Instruments Inc., Dallas, Tex., for example, consisting of micro-mirror arrays that deflect light in a pixel-by-pixel fashion.

Each particular light modulation technology has characteristic strengths and weaknesses. For example, in systems that modulate polarization, contamination can occur between on- and off-states due to inadvertent phase shifting, skew ray or large angle cross-talk, or stress birefringence. In alternate systems that modulate light by deflection or diffraction, angular scattering can cause re-direction of light beams into the imaging path. Often, the characteristic disadvantages of one type of light modulation are not factors with another type.

Polarization effects, however, impact numerous light modulation approaches. Polarization is used, for example, to enable 3D or stereo projection in high-end DLP-based systems. DLP projectors adapted for stereo projection using Real-D (Beverly Hills, Calif.) technology use a polarization rotator to switch between polarization states for right- and left-eye images, as perceived by viewers wearing polarization discriminating glasses. The polarization contrast required for 3D projection in DLP based systems is relatively modest (~400:1), but ghost images can occur if the contrast is too low. Polarized light sources such as visible light emitting lasers are also being used for image projection systems, with or without 3-D projection. Taken together, the polarization sensitivity of a projector, relative to color or contrast artifacts, even in cases where the light modulation components themselves relatively insensitive to polarization, has increased compared to prior art systems.

Color combiners, and other types of optical components for separating and recombining spectral components and for redirecting and conditioning light within the projection apparatus, typically rely on multilayer thin-film optical coatings. Conventional coating designs provide various types of spectral filters with needed levels of reflectivity or transmission at selected wavelengths. However, conventional multilayer coating designs do not provide a highly uniform response to light having different polarization states. In the case of conventional reflective multilayer coatings, for example, there is higher reflectivity for light whose electric field vector oscillates perpendicularly to the plane of incidence (s-polarization) relative to the reflectivity for p-polarized light whose electric field vector oscillates parallel to the plane of incidence over the entire range of incidence angles. The reflectivity for p-polarized light reaches its minimum at the layer-specific Brewster angle. Consequently, noticeable amplitude splits for s- and p-polarized light can occur, particularly in the region about the Brewster angle. At lesser angles, spanning on-axis light, specular light, full-field light, or skew rays, the light efficiency varies with polarization and angle. As another example, if circularly polarized light falls onto a conventional, obliquely-positioned deflecting mirror formed from thin-film coatings, the p-component of the light is more strongly attenuated than the s-component of the light after the reflection. In a polarization sensitive projector, having a polarization analyzer such as a MacNeille prism or a wire grid polarizer, these light efficiency differences can introduce significant contrast or color shading errors. In nominally polarization-sensitive systems lacking a polarization analyzer, on the other hand, image artifacts from these polarization efficiency differences may go largely unnoticed.

Color combiners or other types of dichroic filters can also introduce phase changes for each polarization ($\Delta\phi_s$ and $\Delta\phi_p$), as well as relative phase differences between the various polarization directions ($\Delta\phi_{sp}=\Delta\phi_s-\Delta\phi_p$), meaning that the transiting light experiences differing amounts of rotation according to polarization and angle. As a result, the outgoing polarization state of the light is different from the incoming polarization state. These effects can be compounded in an optical system in which there are multiple reflections for polarized light, so that even slight phase shifts for polarized light on each of a number of surfaces can have an additive effect. Linear polarized light can easily become circularly or elliptically polarized, changing the polarization response as the light then transits downstream optics. For example, with conventional beam combiners, designed for optimal spectral efficiency performance, phase differences $\Delta\phi_{sp}$ between s- and p-polarized light often exceed ±20 degrees or more. Phase difference $\Delta\phi_{sp}$ as large as ±100 degrees or more can often be measured near edge transitions. By comparison, for polarization maintenance, best performance would be achieved with phase differences $\Delta\phi_{sp}$ at or near 0 degrees, or at least within no more than about ±10 degrees, without compromising image quality or brightness while attaining the phase performance.

Where thin-film surfaces handle the p- and s-polarized light differently, the effective contrast of a digital imaging system can be compromised due to light leakage; throughput also suffers accordingly. In systems that use polarized light for left- and right-eye image separation in stereoscopic (3D) imaging, light leakage due to non-uniform handling of polarized light can lead to cross-talk that degrades the stereoscopic viewing effect. Various solutions have been proposed to compensate for known differences in how coatings respond to s- and p-polarized light. In image projection systems, for example, the use of various types of compensating components, such as quarter-wave retarders, has been taught for correcting the de-polarization of thin-film surfaces.

For projection or display systems that depend inherently on polarization manipulation, such as LCD- or LCOS (liquid crystal on silicon)-based systems, the problem is more acute, since undesired polarization differences and consequent light leakage can directly cause image artifacts. LCDs, of course, modulate polarization orientations temporally and spatially, in a pixel-wise fashion, which means that image quality depends on polarization fidelity. Polarization contributes directly to image contrast (>2000:1 for digital cinema), contrast uniformity, and contrast uniformity with color. There are numerous examples of polarization compensators developed to enhance the polarization performance with LCDs, including those designed for vertically aligned or nematic LCDs. These compensators typically use polymer films to provide angular varying birefringence, structured in a spatially variant fashion, to affect polarization states in portions (that is, within certain spatial and angular areas) of the transiting light beam, without affecting the polarization states in other portions of the light beam. Birefringence is a directional variation of refractive index ($\Delta n = n_s - n_p = n_x - n_y$), that can be provided by intrinsic material properties or by form birefringent sub-wavelength structures. Retardance is the phase change $\Delta \phi$ expressed as distance, where the phase change $\Delta\phi(x,t,\lambda) = 2\pi t(\Delta n/\lambda)$. For example a $\pi/2$ (or) 90° phase change $\Delta\phi$ can be provided by a properly oriented compensator having a quarter wave $\lambda/4$ of retardance, which, at 550 nm, equals ~138 nm retardance.

As one example, U.S. Pat. No. 4,701,028 to Clerc et al. describes birefringence compensation designed for a vertically aligned LCD with restricted thickness. U.S. Pat. No. 5,298,199 to Hirose et al. describes the use of a biaxial film compensator correcting for optical birefringence errors in the LCD, used in a package with crossed sheet polarizers, where the LCD dark state has a non-zero voltage (a bias voltage). Additionally, U.S. Pat. No. 5,619,352 to Koch et al. describes compensation devices, usable with twisted nematic LCDs, where the compensators have a multi-layer construction, using combinations of A-plates, C-plates, and O-plates, as needed.

Likewise, in such systems, compensators have also been developed to correct for polarization performance variations of other components, such as the polarization beam splitters or analyzers, either individually or in combination with the LCDs. For example, U.S. Pat. No. 5,576,854 to Schmidt et al. describes a compensator constructed for use in projector apparatus using an LCD with the conventional MacNeille prism type polarization beam splitter. The Schmidt compensator provides 0.27 waves ($\lambda$'s) of compensation, where 0.25$\lambda$'s compensate for the MacNeille prism and 0.02$\lambda$'s of retardance (A-plate) compensate for thermally induced stress birefringence in the counter electrode substrate of the LCD.

In some LCD based projector designs, the color combiner or splitter has its coatings positioned between the LCD panels and the polarization beam splitter. This, in turn, means that system polarization performance is dependent on the design and fabrication of these components. A detailed analysis of this problem is given, for example, by A. E. Rosenbluth et al. in "Correction of Contrast in Projection Systems By Means of Phase-Controlled Prism Coatings and Band-Shifted Twist Compensators" (SPIE Proc., Vol. 3954, pp. 63-90, 2000). Rosenbluth et al. describe a conventional projection architecture in which a "Plumbicon" or "Philips" prism is used in a double-pass configuration to provide both color splitting and recombination. The projector described uses twisted nematic LC panels. The "Plumbicon" tri-prism, described in U.S. Pat. No. 3,202,039 by DeLang, was originally developed for splitting light in TV cameras.

Rosenbluth et al. observe that tilted dichroics are usually polarizing, in that they exhibit a differential phase shift ($\Delta\phi_{ps} = \Delta\phi_p - \Delta\phi_s$), in both reflection and transmission, which causes polarization mixing, or compound angle depolarization, to transiting light beams. In particular, when oblique or skew light traverses color splitting coatings, which tend to be thick, there are generally differences between the effective penetration depths of the s- and p components, giving the coating a differential phase change $\Delta\phi_{ps}$ between the two polarizations. Rosenbluth et al. observe that tilted dichroic coatings are usually strong amplitude polarizers at the edges of the band, which in turn implies a strong differential phase shift throughout the band, because of the dispersion integrals that link phase shift with intensity performance. Thus, as s- and p-polarizations transit the coatings at compound incidence angles, they experience different amplitude and phase responses. The most significant polarization cross-talk occurs when skew rays pass through the tilted beam-dividing coatings of the optical system.

Rosenbluth et al. seek to suppress depolarization from the coatings of the tri-prism assembly by designing the prism coatings to collectively remove the rotational component of depolarization rather than designing the coatings to be individually non-phase shifting. While the dispersion integrals link the phase performance and the light throughput efficiency, substantial changes in phase can be provided with marginal effect on throughput. The design of Rosenbluth et al., exploits the double pass geometry of the Philips prism. That is, individual coatings are not designed to be non-phase shifting (zero phase difference, $\Delta\phi_{ps}=0$), nor are the coatings designed to be collectively phase corrected in single pass, but they are designed to be collectively phase corrected in double pass. The optimization does not emphasize minimizing amplitude de-polarization effects. Rosenbluth et al. basically designed prism coatings so that skew rays experience elliptical polarization without rotation, while the double-pass symmetry of light passing through the prism assembly advantageously cancels the ellipticity. This symmetry and inherent cancellation only holds if the intensity losses in the dichroic coatings are essentially equal for s- and p-polarizations; thus, correction is imperfect near the band edges. Rosenbluth et al. provide examples in which coating depolarization is optimized in combination with the polarization beam splitter (PBS), with or without the benefit of polymeric film compensators that compensate for PBS or light valve depolarization effects.

Aside from Rosenbluth, the phase implications of multilayer thin-film optical coatings are not widely understood by those who specify and design optical thin-film coatings and have been only briefly explored or noted in the literature. However, few if any of the conventional approaches to this problem achieve satisfactory results.

Because de-polarization can degrade the signal-to-noise (S/N) ratio or contrast in telecommunications and other data signal handling optical systems, there have been a number of proposed solutions for compensating for polarization phase shift $\Delta\phi$ where thin-film surfaces are used for narrow-band optical signals. For example, U.S. Pat. No. 4,373,782 to Thelen entitled "Non-Polarizing Thing Film Edge Filter" describes forming an edge filter having the same s- and p-polarization performance on either the rising or falling edge. This provides a polarization-neutral effect for a single, narrow range of frequencies or wavelengths, but does not compensate for polarization effects beyond this narrow range. Similarly, U.S. Pat. No. 5,579,159 entitled "Optical Multilayer Thin Film and Beamsplitter" to Ito describes coatings design approaches that achieve s- and p-polarized light reflectances that are "substantially close to each other over a predetermined wavelength". However, the Ito solution is intended for beam splitter use with a single laser beam in the IR range and this method is also not readily extendible beyond a narrow range of wavelengths.

U.S. Pat. No. 6,014,255 entitled "Polarizing Beam Splitter and Magneto-Optic Reading Device Using the Same" to Van Der Wal et al. describes a magneto-optic reader that is optimized to direct light over a single, narrow IR wavelength, with phase difference Δϕ reduced by thickening the top and bottom layers over a multilayer thin film design. Again, this method does not address the larger problem of polarization compensation applicable to color-combining optics.

With the increasing use of lasers and other narrow-band light sources, some of the conventional strategies and approaches to the problem of combining modulated light beams, originally developed for more broadband illumination, prove unsatisfactory. Optical filters designed for imaging applications using arc lamp and other broadband sources are typically designed to optimize spectral efficiency, maximize bandwidth, and reject IR or UV light. These components are simply not designed to provide the needed performance over the narrow wavelength bands typical of lasers and other solid state light sources, and are generally designed without regard for polarization phase response.

Conventional approaches to reducing phase differences that affect how multilayer thin-film optical coatings handle polarization may work well enough with narrow-range optical signals for telecommunications. However, these conventional solutions fall short of what is needed to compensate for phase- and polarization-shifting effects of dichroic surfaces in image projection. Thus, there is need for an improved method for design of multilayer thin-film optical coatings for phase difference compensation to provide coatings that exhibit reduced polarization-specific response.

SUMMARY OF THE INVENTION

An object of the present invention is to advance the art of combining or splitting laser light of different wavelengths. With this object in mind, the present invention provides an anti-reflective thin film coating formed on an optical surface, comprising a multilayer thin-film stack arranged to suppress reflection of incident polarized light within an incident light wavelength range, wherein the multilayer thin-film stack further provides a reflectance edge transition at a wavelength band that lies outside the incident light wavelength range, and wherein the reflectance edge transition is arranged to provide phase difference compensation to the polarized light within the incident polarized light wavelength range.

A feature of the present invention is the addition of a reflective characteristic over an unused portion of the light spectrum, for the purpose of phase compensation.

An advantage of the present invention relates to phase difference compensation for combining polarized light without perceptibly compromising brightness or other imaging performance characteristics.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIGS. 17A, 17B, and 17C give tables showing the arrangement of multilayer thin-film surfaces in an embodiment in which dichroic surfaces have the same plane of incidence;

FIGS. 18A, 18B, and 18C give tables showing the arrangement of multilayer thin-film surfaces in an embodiment in which dichroic surfaces have orthogonal polarization planes of incidence;

Figures shown and described herein are provided to illustrate principles of operation and structure according to embodiments of the present invention and may not be drawn with intent to show actual size or scale. In a number of cases, idealized graphs are used to describe basic principles of optical filter behavior.

DETAILED DESCRIPTION OF THE INVENTION

The terms "color", "wavelength", "wavelength range", and "wavelength band" are used interchangeably in the description that follows. Red, green, and blue color paths are described for the examples given, since these apply for color projection and other color imaging applications. However, it is to be understood that the methods and apparatus of the present invention can be more broadly applied for different wavelength bands, and may include beam-combining or beam-splitting apparatus that operate to combine or to separate light of different wavelengths that may include those that lie outside the visible spectrum.

Figure 1:
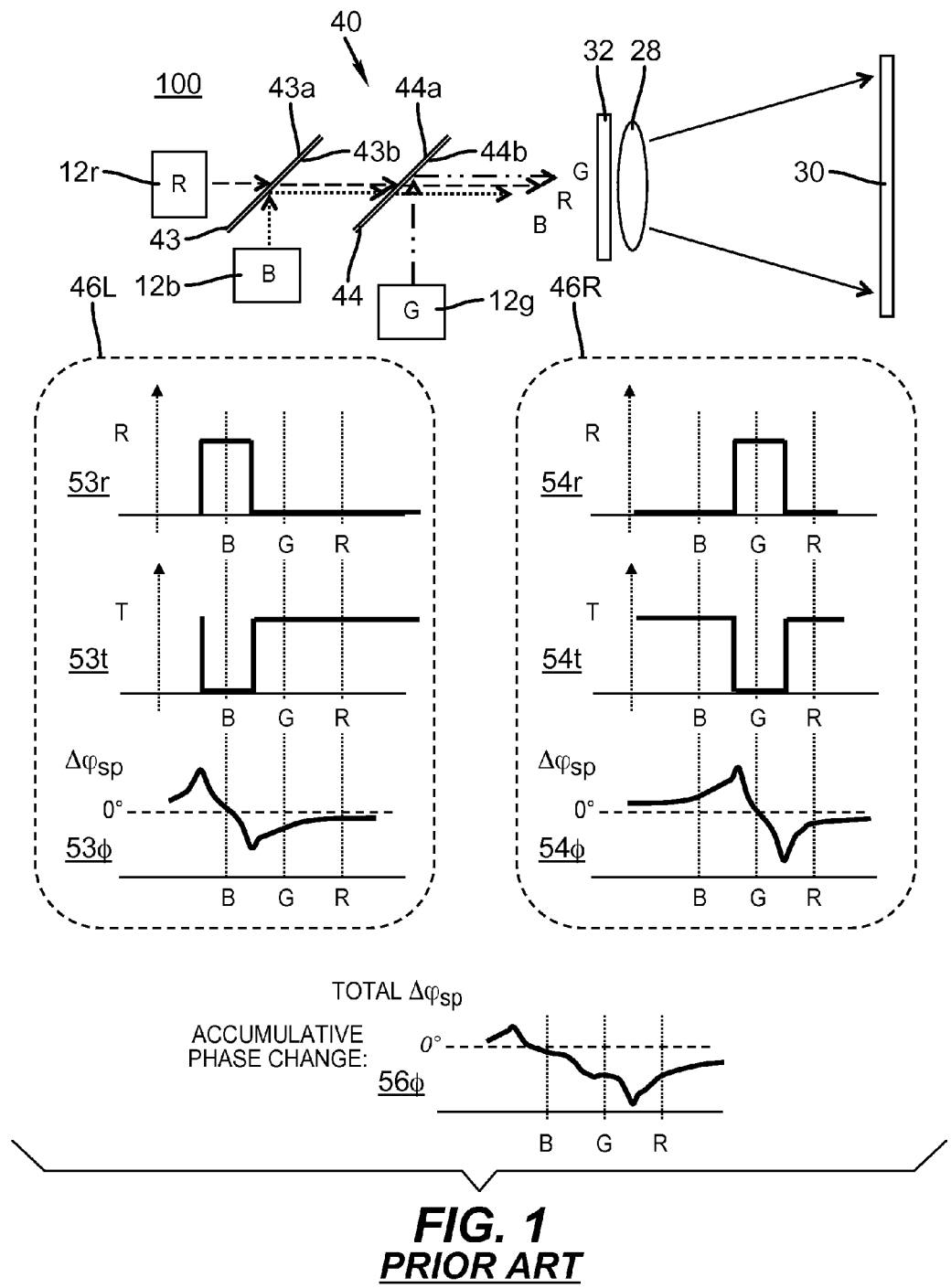
FIG. 1 is a block diagram showing the behavior of conventional beam combiner coatings for an imaging apparatus.

Referring to FIG. 1, there is shown a schematic of a prior art imaging apparatus 100 having a beam combiner 40 that uses two multilayer thin-film plate dichroic elements 43 and 44. Each dichroic element 43 and 44 also has a corresponding anti-reflection (AR) surface 43a and 44a, respectively, and a filter surface 43b and 44b, respectively, with an appropriate dichroic coating. Variations of the FIG. 1 system will be discussed subsequently, both with and without the benefit of the present invention. As shown here, each dichroic element comprises a small sheet or plate of glass, having a multilayer optical coating on each of its two side optical surfaces (rather than the edge surfaces). A dichroic optical coating, as commonly understood in the optical field, provides selective reflection or transmission of light as a function of wavelength. A dichroic optical coating typically provides comparable, although not identical, efficiency response (reflectivity or transmissivity) relative to polarized light through the designed pass band, while the efficiency response typically varies more dramatically for the "s" and "p" polarization states at the pass band edge transitions. As will be discussed subsequently, the phase response also varies at edge transitions with respect to its effect on the polarization states of incident light.

The terms "edge transition", "negative reflectance edge transition" and "positive reflectance edge transition" have their conventional meaning as these terms would be understood by one skilled in the optical coating arts. An edge transition is intentionally formed using multilayer thin-film coatings and following design principles used in the optical coating arts. An edge transition occurs within a narrow bandwidth of not more than about 25-30 nm. An edge transition can be created by forming a notch filter, a low-wavelength pass (LWP) filter, or a high-wavelength pass (HWP) filter, for example. Edge transitions for reflective filters are of particular interest for the present invention; it is these edge transitions that are deliberately designed and used to provide phase difference compensation for light combiner apparatus in the description that follows.

The term "reflective" has its conventional meaning in the context of optical coatings. A multilayer coating can be said to be reflective for a wavelength band where it is at least about 80% reflective to light over the band. The term "anti-reflective coating" or "AR coating" has its conventional meaning in the context of the present disclosure, which typically means a coating that modifies an air-glass interface to have greater than about 95% transmission over some anti-reflection wavelength band. Embodiments that may manipulate AR coating properties so as to provide phase compensation, do so at wavelength ranges that lie outside the needed anti-reflection wavelength bands provided by these coatings. For imaging apparatus, for example, an AR coating would be used to prevent reflection over the visible range. Altered reflective properties that are only outside the visible wavelength band, such as in ultraviolet UV or infrared IR wavelength bands, do not impact the performance of the AR coating with respect to its primary function in a projector or other imaging apparatus.

Where they are used, the terms "first", "second", and so on, do not necessarily denote any ordinal or priority relation, but may be simply used to more clearly distinguish one element from another.

In the context of the present invention, blue, green, and red light have their conventional meanings and wavelength ranges as these colors are understood to have to those skilled in the electronic imaging and projection arts. Typical values for these colors in one embodiment are generally within these approximate ranges: red $\lambda_o$=637 nm and its range is generally 620-660 nm; green $\lambda_o$=532 nm and its range is generally 520-560 nm; blue $\lambda_o$=465 nm and its range is generally 440-480 nm. In general, the selected light sources have spectral emission bandwidths $\Delta\lambda$ that fall within these ranges, although the bandwidths $\lambda 2$ of individual light sources can be much smaller. For example, an individual green laser may have a spectral bandwidth $\Delta\lambda$~0.1-2.0 nm, and an array of multiple green lasers of that type may have a spectral bandwidth $\Delta\lambda$~2-7 nm.

In figures and description of the present application, the notation $\Delta\phi$ is used to denote phase change, including differential phase change, where $\phi$ indicates phase. The subscript "t", where used, indicates "transmission." For example, $\Delta\phi_t$ means a change of phase that occurs in transmission. Similarly, the subscript "r", where used, indicates "reflection."

Figure 6:
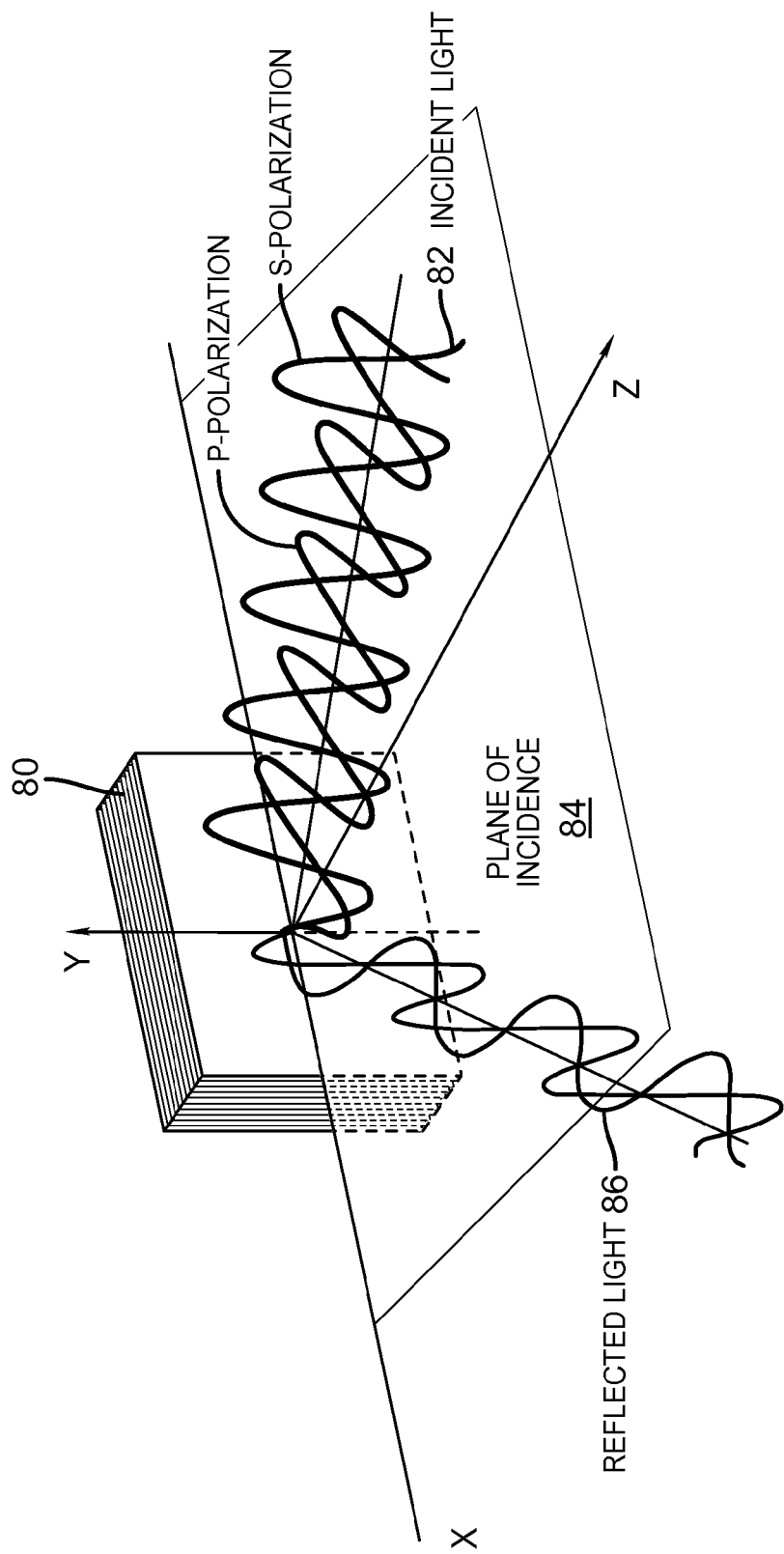
FIG. 6 is a perspective view showing orientation of polarized light components relative to polarization plane of incidence.

As was noted in the background section given earlier, s- and p-polarized light interact differently upon incidence with multilayer thin films, which causes some unwanted amount of relative phase difference ($\Delta\phi_{sp}$) for these components of incident polarized light. Considering FIG. 6, incident light 82 is incident at an angle onto an optical element 80 that typically comprises a small sheet of plate glass. Incident light 82 can have either s-polarized light (oscillating normal to the plane of incidence 84), p-polarized light (oscillating within the plane of incidence 84), or both (both are shown). Although incident light 82 can be transmitted, reflected, or both, from optical element 80, depending on the properties of optical element 80, only reflected light 86 is shown. Light of either polarization orientation can experience a phase change $\Delta\phi$ at the optical element 80, and both polarizations can experience an identical phase change $\Delta\phi$ or no phase change ($\Delta\phi$=0), such that there is no differential phase change ($\Delta\phi_{sp}=\Delta\phi_s-\Delta\phi_p$=0). As another example, effectively no differential phase change can also occur upon reflection if the differential phase change is shifted in phase by 180° ($\pi$), or multiples thereof, such that $\Delta\phi_{sp}=\Delta\phi_s-\Delta\phi_p$=180°. In these cases, the initial polarization relationships are maintained.

Optical element 80 can also cause differential responses for the s-polarized and p-polarized light, relative to reflectivity, transmissivity, and reflected or transmitted phase. For example, if s-polarized light experiences a phase change ($\Delta\phi_s$), while p-polarized light experiences a different phase change ($\Delta\phi_p$), the resulting phase $\phi_s$ of s-polarized light will have one value, and the phase $\phi_p$ of p-polarized light will have another value, and a non-zero phase difference will result ($\Delta\phi_{sp}=\Delta\phi_s-\Delta\phi_p\neq 0$). The phase difference can be calculated as $\Delta\phi_{sp}=\Delta\phi_s-\Delta\phi_p$ or as $\Delta\phi_{ps}=\Delta\phi_p-\Delta_s$, although the choice can depend upon geometry. The phase change term $\Delta\phi$ is used herein to denote phase change generally rather than a polarization specific change ($\Delta\phi_p$, $\Delta\phi_s$), or to denote a phase difference generally, without concern for geometry ($\Delta\phi_{sp}$, $\Delta\phi_{ps}$).

With respect to combiner design, the goal can be to reduce the differential phase change in transmission or reflection (as appropriate) to near zero (Δϕ=0) for each combiner element individually, or for the combiner elements in aggregate. For example, in commonly-assigned, co-pending U.S. patent application Ser. No. 12/171,916 to Silverstein et al., entitled "Laser Illuminated Micro-Mirror Projector," combining elements are designed to individually reduce differential phase change Δϕ to near zero by positioning edge transitions, and their associated phase profiles as far away from the wavelengths of interest ($\lambda_o$) as possible. For the green color channel, this can mean trying to position edge transitions equally between the green and blue, or green and red wavelengths of interest. Although this approach can work, particularly for color channels with narrow spectral bandwidths Δλ, residual phase differences Δϕ can still be significant, and small coating variations can cause large phase shifts or changes, imparting significant phase differences despite the design intent.

As another aspect, the two polarizations can encounter different or similar reflection ($R_p$ or $R_s$) or transmission efficiencies ($T_p$ or $T_s$), as described by the well known Fresnel equations. While it is certainly desirable to provide comparable efficiencies ($T_p \sim T_s$, and $R_p \sim R_s$), other mechanisms or methods can often be used in imaging systems to compensate for modest light level variations occurring at the dichroic combiner surfaces.

As further background, the propagation of light can be described by the well known wave equations, including Eq. (1) which describes a plane polarized wave ψ(x,t) travelling a distance x for a time t, where A(x,t) is the amplitude function, and ϕ(x,t) is the phase of the disturbance:

$$\psi(x,t)=A(x,t)e^{i\phi(x,t)} \quad (1)$$

where x is the distance along the optical path, and t is the time.

The phase equation can be written various ways, including with an initial phase is given by ϵ, which is a value that can be subsequently ignored for current purposes:

$$\phi(x,t)=\omega t-kx+\epsilon \text{ or } \phi(x,t)=\omega t-kx=\omega(t-x/v) \quad (2)$$

where ω is the rate of change of phase with time, k is the rate of change of phase with distance, and v is velocity. The value ω is also known as the angular frequency, where ω=2π/ν, and the value k is also known as the propagation number, where k=2π/λ. The frequency ν and the wavelength λ of light are related by the speed of light, c=λ/ν. The wavelength λ of light in free space is usually expressed in microns (μm) or nanometers (nm). As light enters and traverses a material, it can experience a variable reflectivity and phase change Δϕ, depending on the angle of incidence, the polarization orientation of the incident light relative to the media, the refractive index n, and the thickness of the material. The Fresnel equations, which model surface reflectance or transmission, affect the amplitude term of Eq. (1). The refractive index in a material or medium is basically the ratio of the speed of light in vacuum c to the speed in the medium v (n=c/v). Substituting into Eq. (2) puts the phase in terms of the refractive index:

$$\phi(x,t)=\omega t-(2\pi n/\lambda)x \quad (3)$$

Even in an isotropic material of constant refractive index, a differential phase change Δϕ can occur for different beam propagation angles, as the optical path length (t/n) in the material changes from one angle to another. In the case of a complex structure, such as a thin film coating with multiple layered materials, differential reflectivity and phase changes can occur for different beam propagation angles. Thus, tilted dichroics are usually polarizing, as they exhibit a differential amount of rotation and ellipticity induced on the illumination by the coatings, per degree of ray angle (skew or otherwise). Thus, differential phase changes Δϕ can occur depending on the angle and polarization states of the incident light; ($\Delta\phi=\Delta\phi_{sp}=\Delta\phi_s-\Delta\phi_p$) or ($\Delta\phi=\Delta\phi_{ps}=\Delta\phi_p-\Delta\phi_s$).

Although there are methods for reducing the amount of phase change Δϕ by manipulating one or more thin-film material characteristics or design structures, such as by polarization matching edge transitions or band pass reflectance, such changes do not generally provide sufficient compensation for the magnitude of the phase difference. It can be observed that there are other known techniques, familiar to those skilled in the art, which can be used to adjust and optimize a multifilm coatings design in order to minimize phase shift. For example, some amount of compromise can be achieved by sacrificing efficiency and throughput in specifying color filter characteristics relative to the wavelengths of light that are used. However, beyond somewhat narrow adjustment tolerances, there can be very little benefit available to the optics designer, in practice, for improving performance of optical coatings and for reducing phase shift differences using conventional approaches.

As noted earlier in the background section, conventional beam combiners typically fail to address the problem of phase difference Δϕ for polarization components of the incident light and often exhibit phase differences well in excess of ±20 degrees. The apparatus and method of the present invention provide ways to improve beam combiner performance in this respect and to reduce phase difference to within a preferred range of ±10 degrees or less.

Returning to FIG. 1, color channels 12r, 12g, and 12b, represented in block diagram form in this figure, provide modulated light of red, green, and blue, respectively, to be combined at beam combiner 40 and directed to a projection lens 28 for projection onto a display surface 30. Again, beam combiner 40 comprises two multilayer thin-film plate dichroic elements 43 and 44 having dichroic optical coatings for reflecting and transmitting light selectively based on wavelength. The modulated light in each channel can be modulated by SLMs (not shown) that use digital micromirror arrays, such as DLP devices. Temporally or spatially modulated polarized light can be provided by the SLMs or by a polarization switching device located optically upstream of the spatial light modulators. As compared to a conventional system that use a Plumbicon prism in double pass to separate light in one direction and combine color beams in another direction, dichroic elements 43 and 44 are used to combine the light in a single pass. That is, light in each respective color channel (12r, 12g and 12b) traverses an optical path (not shown) that does not transit combiner 40 on an occasion prior to the combination of the light beams by beam combiner 40 as shown in FIG. 1.

The red, green, and blue light paths are represented with a slight spatial offset in FIG. 1, to help show the basic transmission and reflection functions of dichroic elements 43 and 44. In practice, these light paths are overlaid along the same output axis. The red, green, and blue color channels (12r, 12g and 12b) each include light sources, which are preferably lasers, although other narrow-band light sources, including Light-Emitting Diodes (LEDs) or Super-luminescent Light-Emitting Diodes (SLEDs) can be used. Color channels 12g, 12b and 12r either emit polarized light, or have light polarized by a pre-polarizer (not shown), or both. A polarization analyzer 32 or, optionally, polarization beam splitter is provided in the optical path, downstream of the second dichroic element 44, to for example, enable stereo image projection.

Display surface 30 is a target plane, in which a screen typically resides, upon which an audience can view the projected images.

Also shown in FIG. 1 are representative filter graphs for transmission (T) and reflection (R) and for the phase difference $\Delta\phi_{sp}$ between s- and p-polarized light for each filter surface 43b and 44b of dichroic elements 43 and 44. Encircled by the dashed box 46L on the left are a reflection filter graph 53r and a transmission filter graph 53t for filter surface 43b of dichroic element 43. A phase difference graph 53φ shows the phase difference $\Delta\phi_{sp}$ for the high wavelength pass (HWP) edge filter of dichroic element 43. Significant phase differences $\Delta\phi_{sp}$ are imparted to the transiting green and blue light by the (HWP) edge filter of dichroic element 43. Similarly, encircled by the dashed box 46R on the right are a reflection filter graph 54r and a transmission filter graph 54t for filter surface 44b of dichroic element 44. A phase difference graph 54φ shows the phase difference $\Delta\phi_{sp}$ for the notch filter of dichroic element 44. An accumulated phase change graph 56φ then shows the sum of accumulated phase difference $\Delta\phi_{sp}$, computed by summing phase difference graphs 53φ and 54φ. Here, the magnitude of the accumulated phase difference $\Delta\phi_{sp}$ for light in the green and red wavelength bands exceeds 20 degrees, and may be as much as 100 degrees or more. This phase performance is typical of many standard filter designs.

Figure 2A:
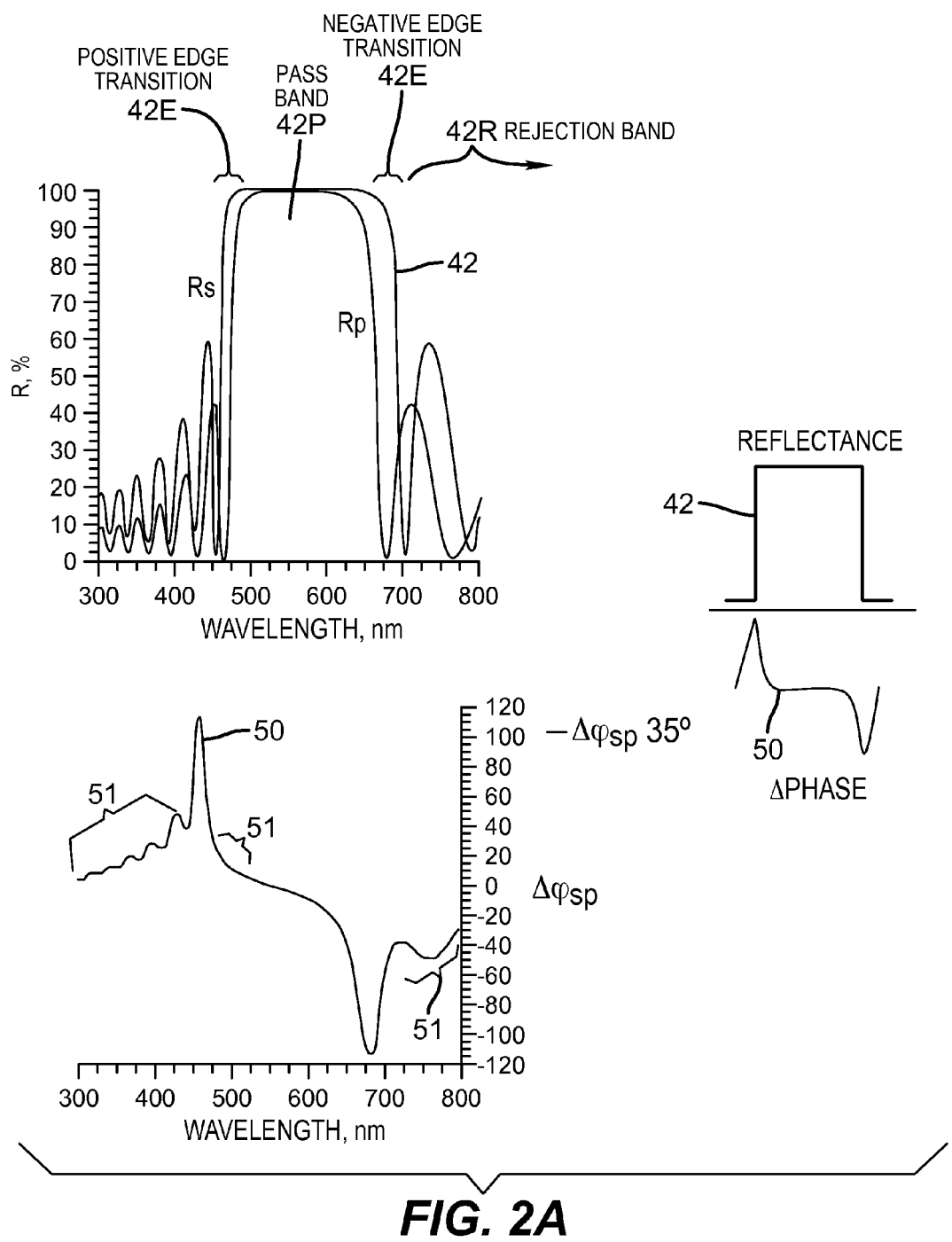
FIG. 2A is a set of graphs that show the phase difference relationship for a representative reflective multilayer thin film filter.

As noted previously, Rosenbluth et al. observed that tilted dichroic coatings are usually strong amplitude polarizers at the edges of a pass band. This, in turn, implies a strong differential phase shift throughout the band because of the dispersion integrals that link phase shift with intensity performance. Thus, as s- and p-polarization components transit the coatings at compound incidence angles, they experience different amplitude and phase responses. With respect to this behavior, the inventors have further observed that there is a characteristic relationship between phase shift and filter band edges (or reflectance edge transitions) of dichroic coatings. Specifically, as shown in FIG. 2A, a positive or negative phase change difference $\Delta\phi_{sp}$ characteristic of the phase difference profile 50 corresponds to the positive or negative edge transition 42E of the reflectance stack. An example reflectance filter curve set (both s and p polarization reflectance profiles 42) for a notch filter with a pass band extending from ~470 nm to ~690 nm, and with rejection bands below 470 nm and above 690 nm, is shown on the upper left in FIG. 2A. Below this example is shown the corresponding plotted response for phase difference ($\Delta\phi_{sp}=\Delta\phi_s-v\phi_p$) that occurs over the same range of wavelengths with this filter. The schematic diagrams on the right summarize the basic behavior of phase difference to reflection band edges. The phase difference change profile 50 has a positive phase difference $\Delta\phi_{sp}$ that corresponds to the rising band-edge, or the positive edge transition 42E of the reflectance profile 42. A negative phase difference $\Delta\phi_{sp}$ corresponds to the falling band-edge of the reflectance profile 42, that is, to the negative edge transition 42E of the reflectance curve. Note that a negative edge transition 42E for a tilted dichroic filter in reflection appears as a positive edge transition 42E for that filter in transmission. Following a relatively pronounced response at each transition, the phase difference $\Delta\phi_{sp}$ then drifts back toward zero for longer wavelengths.

It should be emphasized that phase differences vary considerably with wavelength; $\Delta\phi(\lambda)$. Considering the asymmetrical phase difference profile 50 on the left, at each band edge, phase difference peak magnitudes in excess of 80 degrees are observed ($|\Delta\phi_{sp}|=|\Delta\phi_s-\Delta\phi_p|>80°$), along with large phase differences ($|\Delta\phi_{sp}|=|\Delta\phi_s-\Delta\phi_p|>20°$) about the edge transitions that extend to become phase tails 51 of the phase profile for ~40 nm towards the pass band center, and for ~100 nm into the adjacent low reflectance rejection bands. It is also noted that the phase tails 51 into the rejection bands tend to be shorter, or compressed, at shorter wavelengths as compared to those at longer wavelengths. In the case of the exemplary notch filter of FIG. 2A, it is also noted that there are pronounced ripples in the reflectance profiles 42 outside the nominal 470-690 nm pass band. The corresponding phase difference profile 50 shows some small ripples in the phase tails 51 at the corresponding wavelengths. In cases where notch or edge filters are designed without pronounced rejection band reflectance ripples, dramatic phase changes (in magnitude and extent) are still observed about the edge transitions, but without the small rippling effects shown here. This behavior will be evident with later design examples.

Figure 2B:
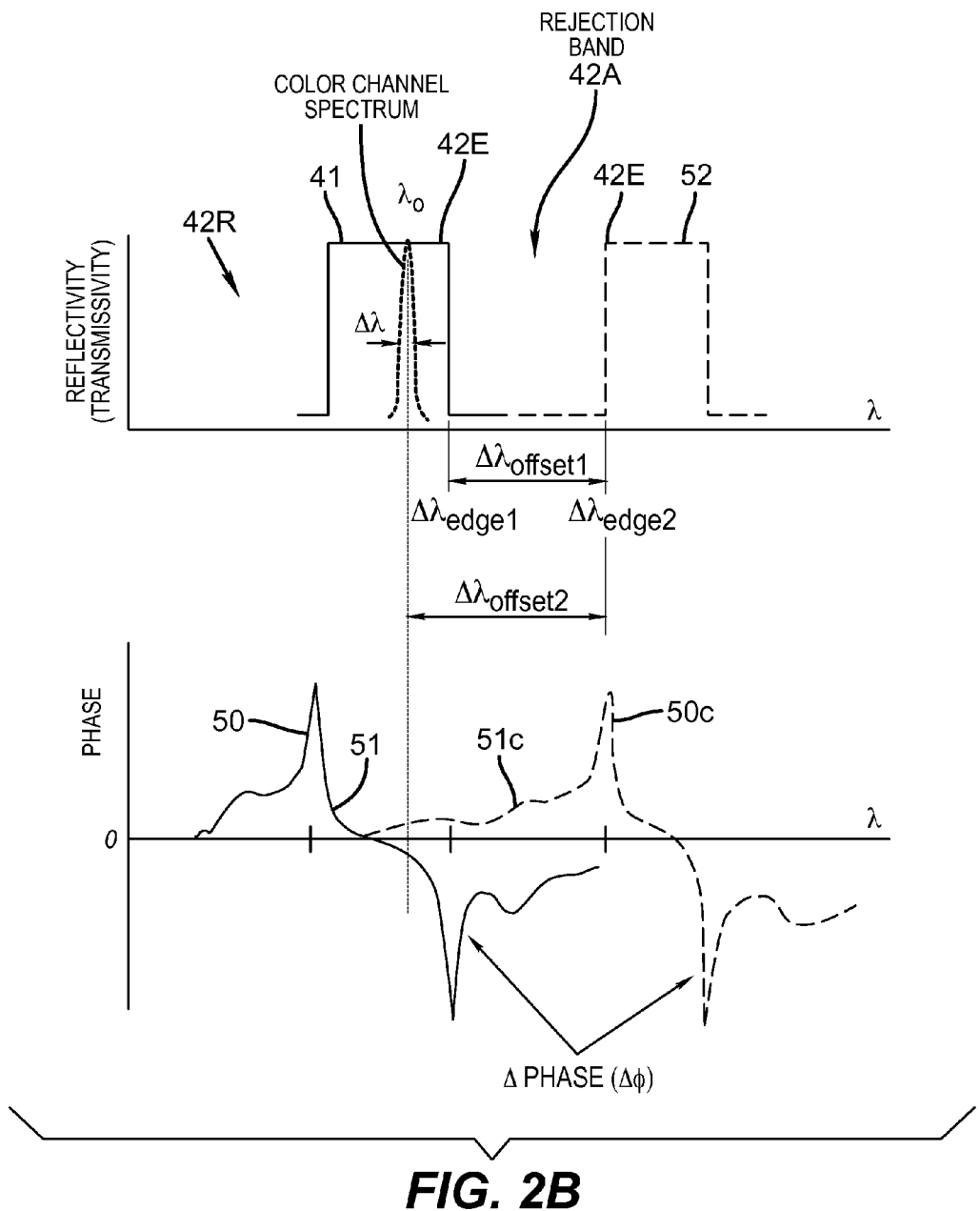
FIG. 2B illustrates design principles of the present invention.

In considering the behavior shown in FIG. 2A, and expanded upon in FIG. 2B, the inventors have found that interaction between characteristic positive and negative phase difference $\Delta\phi$ curves can be utilized for reducing phase differences for multilayer thin-film coated surfaces. Thus, for example, a primary dichroic element 41 with a primary spectral bandpass (or pass band 42P) exhibits the general behavior shown in FIG. 2B with respect to phase difference profile 50 having phase tails 51. If an edge transition 42E for a second phase compensating dichroic element 52, having a phase compensating spectral bandpass and an associated phase difference profile 50c, is provided along the light path in sufficient proximity to the primary spectral band in terms of wavelength, the characteristic phase responses associated with the adjacent edge transitions 42E can interact in an advantageous way. As shown in FIG. 2B, the phase tails 51c of the phase difference profile 50c for a phase compensating dichroic element 52 interact with the phase tails 51 of the phase difference profile 50 for the primary dichroic element 41 near the target wavelength ($\lambda_o$) to provide reduced combined phase differences. This can occur even when two bandpasses are spectrally separated by an intervening rejection band 42R of width $\Delta\lambda_{offset1}$. For example, the pass bands 42P of both the primary dichroic element 41 and the phase compensating dichroic element 52 can have high reflectivity (Rp, Rs>90%) while the intervening rejection band 42R has low reflectivity (Rp, Rs<5%). If the intervening rejection band 42R is sufficiently narrow ($\Delta\lambda_{offset1}$<50-100 nm) between the two edge transitions, $\lambda_{edge1}$ and $\lambda_{edge2}$, the negative phase difference profile of the proximate falling edge and the positive phase difference profile of the proximate rising edge can interact or combine at the intended spectral band to reduce the phase differences $\Delta\phi_{sp}$ imparted to the light at the wavelengths of interest ($\lambda_o\pm\Delta\lambda/2$), provided that significant phase difference compensation is present across the desired wavelength span ($\Delta\lambda_{offset2}$). The two distances $\Delta\lambda_{offset1}$ and $\Delta\phi_{offset2}$, can be nearly identical, or significantly different, depending on how close the target wavelength ($\lambda_o$) is to the edge transition. The application of this concept will become clearer in subsequent design examples.

The apparatus and method of the present invention apply the design approach suggested by FIG. 2B. That is, the relationship of phase change to band-edge for a reflective filter is used to compensate for phase difference $\Delta\phi$, by providing a phase difference compensation multilayer thin-film stack that then provides a more uniform phase response to light of different polarization states at particular target wavelengths. In particular, a phase compensating dichroic element 52, which is provided as a phase compensating filter having a supplementary multilayer thin-film stack, provides a spectral band pass and edge transitions 42E at wavelengths outside the spectral bandwidth containing the wavelengths of interest that are present at the surface on which the phase compensating dichroic element 52 is formed. To be effective, the phase tails 51c of the phase difference profile 50c associated with the phase compensating dichroic element 52, must extend far enough ($\Delta\lambda_{offset}$) and have the right sign (+or −) and magnitude, to provide phase difference $\Delta\phi$ compensation for the phase impact of the primary dichroic element 41 of the dichroic filter. As will be discussed subsequently, phase compensating dichroic element 52 can be provided on a surface of a dichroic element, or on a surface having an AR coating, or on some other optical element. Both the primary dichroic element 41 and the phase compensating dichroic element 52 can be notch filters, or pass edge filters, and examples of both will be given subsequently. Embodiments of the present invention employ this phase-change response to reflectance band-edge behavior as a mechanism for compensating the phase shift that affects polarization for spectral filters generally, and beam combiners in particular. Referring back to the conventional arrangement of FIG. 1, for example, the accumulated phase difference shown in phase difference graph 56φ can be reduced using appropriately constructed thin film structures that affect a phase difference $\Delta\phi_{sp}$ that does not compromise image quality.

Figure 3:
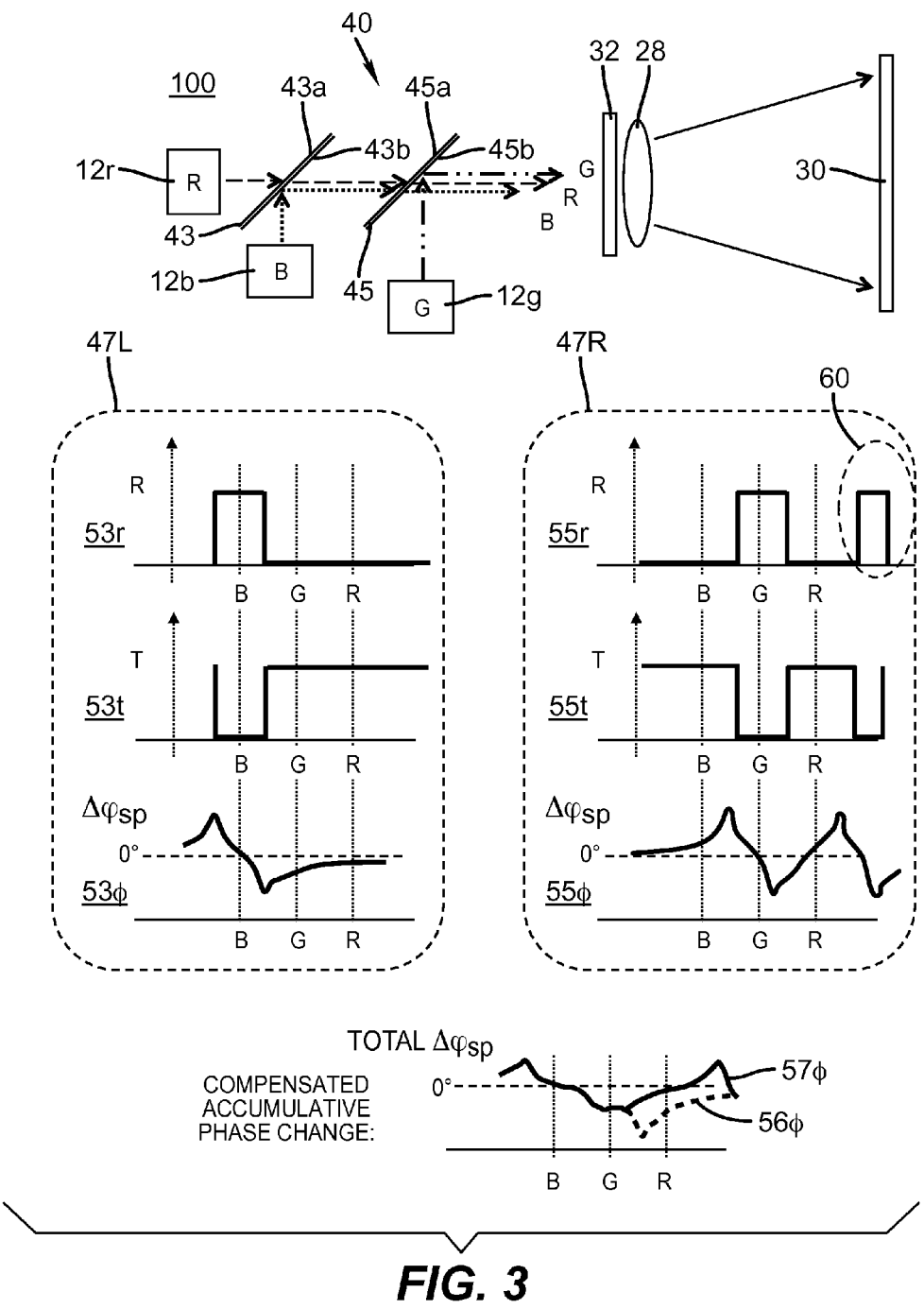
FIG. 3 is a block diagram showing phase compensation provided by the beam combiner coatings for the embodiment of FIG. 1.

Referring to FIG. 3, the method of phase difference compensation is shown for one embodiment. In this configuration, the dichroic element 44 of FIG. 1 is replaced by a dichroic element 45 having a phase compensating feature. The dichroic element 43 has an anti-reflection surface 45a and a filter surface 45b. On the left side of FIG. 3 in box 47L, reflection filter graph 53r, transmission filter graph 53t, and phase difference graph 53φ are repeated from FIG. 1 for the high wavelength (red) pass (HWP) edge filter of dichroic element 43. In order to compensate for the negative phase change in the intended spectral bandpass in the red wavelengths, a second supplementary spectral bandpass or reflectance band, is provided by phase compensating spectral bandpass 60 (encircled in FIG. 3), which is added to the filter surface 45b of dichroic element 45. Phase compensating spectral bandpass 60, in this instance is a specific type of phase compensating dichroic element (52), and corresponds to an infrared (IR) spectral bandpass notch filter, that is formed by adding a stack of layers to the multilayer thin film stack on filter surface 45b, wherein the stack reflects light of longer wavelengths outside the visible region. On the right side of FIG. 3 in box 47R, reflection filter graph 55r, transmission filter graph 55t, and phase difference graph 55φ illustrate the characteristics of the filter when the phase compensating spectral bandpass 60 is added to the formulation of the filter characterized by the graphs in box 46L of FIG. 1. Phase difference graph 55φ shows the effect of this modification to the thin-film filter formulation at filter surface 45b, that is, the addition of IR phase compensating spectral bandpass 60 to the multilayer thin-film stack for filter surface 45b. Here IR phase compensating spectral bandpass 60 provides a phase difference $\Delta\phi_{sp}$ reducing or compensating structure for light in the intended (red) spectral pass band, thus improving the phase response over the red region. This can occur even though the color channels 12r, 12g and 12b provide no IR light to interact with the phase compensating spectral bandpass 60. The resulting compensated accumulated phase change is shown at the bottom of FIG. 3 as phase difference graph 57φ. For comparison, the initial accumulated phase difference $\Delta\phi_{sp}$ is repeated from FIG. 1 and shown as the dashed phase difference graph 56φ, showing the improvement that the added reflectance band of the phase compensating spectral bandpass 60 provides, in particular at the red wavelength.

A number of observations can be made:
(i) Using the arrangement of dichroic elements in beam combiner 40 of FIG. 1, the compensating spectral bandpass 60 can alternately be added on any of anti-reflection surfaces 44a, 43a, or filter surface 43b. That is, the compensating filter structure of the phase difference compensation multilayer thin-film stack can be formed on any surface that directs the red light through beam combiner 40. Although counter-intuitive, this even includes forming a reflective notch filter in the formulation of the anti-reflective (AR) coating. Example 1, given subsequently, illustrates this approach. (This flexibility for selection of a surface may or may not be the case with other beam combiner configurations, depending on the wavelength compensation that is provided, as shown in a subsequent example.)
(ii) In the case that the phase compensating dichroic element 52 is a notch filter, two edge transitions are provided. However, typically only one has relevance. As an example, in FIG. 3, the notch filter provided both a rising (red) edge, and a trailing or falling edge. The trailing edge of the reflectance band provided with phase compensating spectral bandpass 60 extends further into the IR region and any resulting phase shift is of no interest for visible projection applications.)
(iii) Harmonics of the phase compensation filter can also be used for phase compensation. In general, a λ/3 harmonic occurs for the conventional thin-film filter, unless specific steps are taken to suppress this harmonic. For the reflectance band provided by the notch filter type phase compensating spectral bandpass 60 in the example of FIG. 3, which can be in the 720-1050 nm range, the corresponding λ/3 harmonic would be in about the 240-350 nm range, or well into the UV region. As such, a notch filter harmonic can potentially provide the needed falling band-edge transition in the UV or low blue, with phase tails 51 that would provide a negative phase difference that can help to compensate for the accumulated positive phase change at blue wavelengths.
(iv) While the reflectance band is shown as a notch filter in the example of FIG. 3, a low-wavelength pass (LWP) filter in the IR can alternately be used. What is needed is the phase shift effect, caused by an edge transition in the positive direction, close enough (appropriate $\Delta\lambda_{offset2}$) to the red wavelength in order to cause a positive phase difference. In order to provide its compensation function, the phase difference compensation multilayer thin-film stack provides a compensating edge transition offset from the first, second, or third wavelength band by $\Delta\lambda_{offset1}$<~100 nm. Put another way, the reflective edge transition that provides the phase compensation lies on some surface along the output light path; and the edge transition itself is at a wavelength $\lambda_{edge}$ that lies outside the wavelength bands of light incident on that surface. The compensating edge transition is within less than ~100 nm of the band (appropriate $\Delta\lambda_{offset2}$) it is intended to affect. At shorter wavelengths, less distance is more desirable as the phase tails 51 are often compressed in magnitude or extent; but as wavelengths increase, a longer distance up to about 100 nm can yield acceptable performance. It is noted that coating behavior is generally not mathematically symmetrical or identical with wavelength. Thus, the spectral distances $\Delta\lambda_{offset1}$ or $\Delta\lambda_{offset2}$ are guidelines, depending on the spectral position $\lambda_o$ and width $\Delta\lambda$ of the light source or color channel relative to the edge transitions, and the magnitude of the phase compensation needed. For example, a phase compensating dichroic element 52 with a red-near IR edge transition can be designed with the edge transition in the 680-740 nm spectral range to help phase at in the red at ~635 nm. Whereas, a phase compensating dichroic element 52 with a red edge transition can be designed with the edge transition in the 580-650 nm spectral range to help phase in the green at ~635 nm. Basically, the spectral offsets avoid using the dramatic swings in the phase profiles that occur near the edge transitions ($\lambda_{edge}$), but provide compensation of a given source spectrum using the (opposite sign) phase tails 51 (as discussed with reference to FIG. 2B).

Thus, as the example of FIG. 3 shows, the method of the present invention modifies the conventional approach to thin-film filter design, adding positive or negative reflectance band transitions in unused wavelength regions, such as outside the visible range in IR or UV regions. In this example, a phase difference compensating dichroic element 52, provided as a notch filter with a phase compensating spectral bandpass 60, is formed as a thin film stack on a surface of either the first or second dichroic element and is reflective at a wavelength that is distinct from, or alternately termed, outside of, the set of wavelength bands that provide first, second, or third colors (blue, green, or red). The edge transition ($\lambda_{edge}$) of the reflected wavelength for compensation can be outside the visible as shown in the FIG. 3 example or within the visible, provided that it is distinct from the wavelengths of each of the composite colors for light incident on the same surface. An alternate example showing the addition of this reflective edge transition within the visible spectrum is given subsequently with respect to FIGS. 4 and 5.

Figure 4:
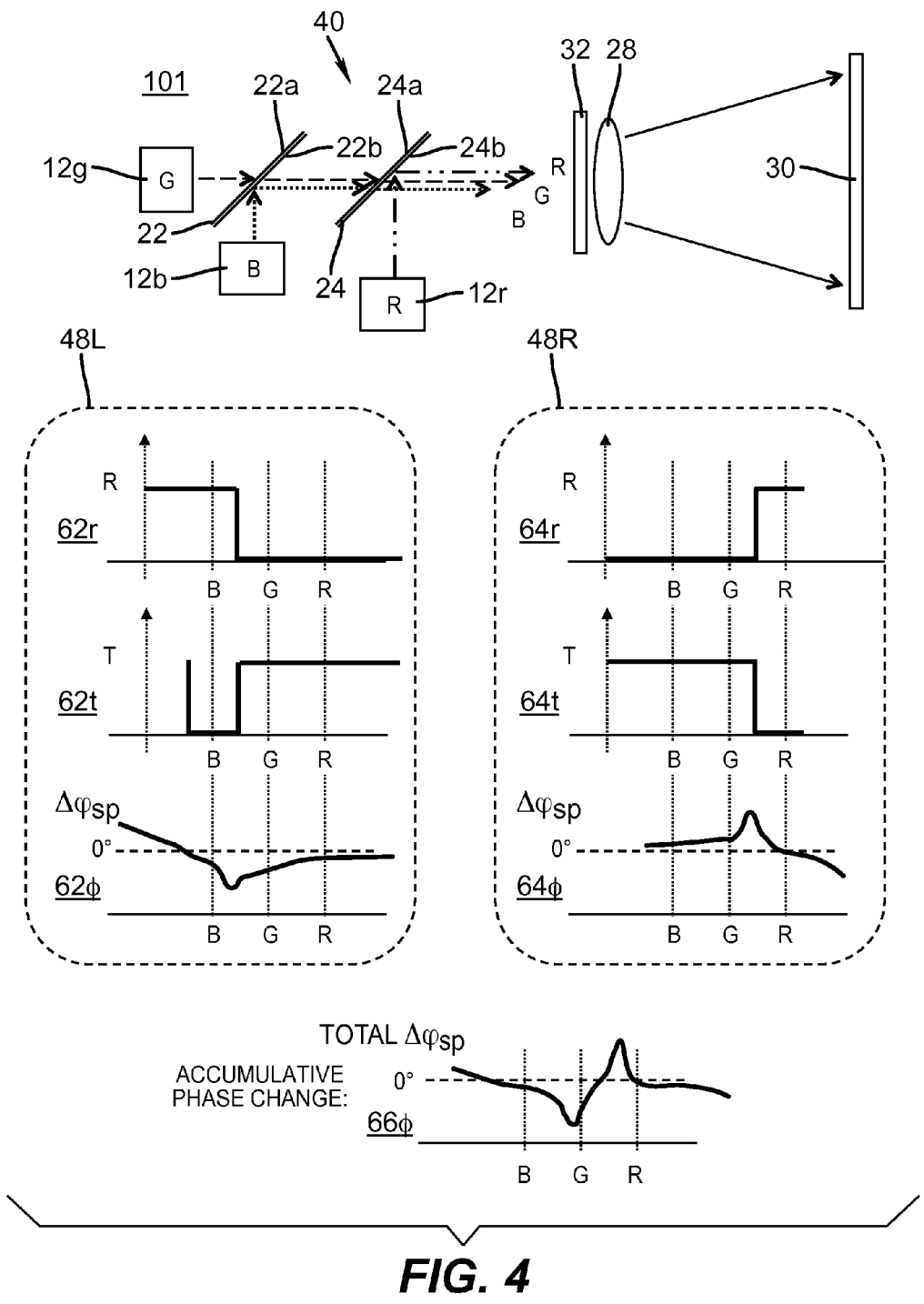
FIG. 4 is a block diagram showing the behavior of beam combiner coatings for an imaging apparatus in an alternate embodiment.

FIG. 4 shows an alternate embodiment of an imaging apparatus 101 having a different arrangement of colors at beam combiner 40 that expands upon the basic strategy described with reference to FIGS. 1 and 3. In this example, green light is transmitted through both multilayer thin-film dichroic elements 22 and 24. Each dichroic element 22 and 24 has a corresponding anti-reflection (AR) surface 22a and 24a and a filter surface 22b and 24b with a dichroic coating, respectively. Each of the color channels 12r, 12g, and 12b, represented in block diagram form in this figure, provides modulated light, red, green, and blue, respectively, to be combined at beam combiner 40 and directed to projection lens 28 for projection onto display surface 30. Again, red, green, and blue light paths are shown with a slight offset in this figure, to help show the basic transmission and reflection functions of dichroic elements 22 and 24; in practice, these light paths are overlaid onto the same output axis.

Also shown in FIG. 4 are representative filter graphs for transmission (T) and reflection (R) and the phase difference $\Delta\phi_{sp}$ for each filter surface 22b and 24b of dichroic elements 22 and 24. On the left side of FIG. 4 in box 48L are a reflection filter graph 62r and a transmission filter graph 62t for filter surface 22b (blue mirror) of dichroic element 22. A phase difference graph 62φ shows the phase difference $\Delta\phi_{sp}$ for the high wavelength pass (HWP) edge filter of dichroic element 22. It should be noted that there is essentially no phase-change effect on red light from dichroic element 22, since the red light does not transmit or reflect from this surface, although phase difference $\Delta\phi_{sp}$ effects on the blue and green are significant. Similarly, on the right side of FIG. 4 in box 48R are a reflection filter graph 64r and a transmission filter graph 64t for filter surface 24b (red mirror) of dichroic element 24. A phase difference graph 64φ shows the phase difference $\Delta\phi_{sp}$ for the filter surface 24b of dichroic element 24. This red mirror imparts significant phase differences $\Delta\phi_{sp}$ on the green spectra, and lesser amounts on portions of the blue and red spectra. An accumulated phase difference graph 66φ then shows the sum of effective accumulated phase change, computed by summing phase difference graphs 62φ and 64φ for wavelengths that are affected by the phase change. As phase difference graph 66φ shows, blue and red are substantially well-corrected for phase change, with small phase differences $\Delta\phi_{sp}$ in significant portions of these spectra, as the profiles of phase difference graphs 62φ and 64φ tended to cancel in these regimes. Depending on the specification for allowed residual phase change, this performance may be sufficient. The low red spectra does show some significant phase differences, whose importance would depend on the wavelength ranges (as characterized by $\lambda_o$ and $\Delta\lambda$) of the actual sources that are used. However, for the green light, there is little effective phase difference cancellation, and the actual accumulative phase difference $\Delta\phi_{sp}$ increased relative to phase difference graph 62φ.

Figure 5:
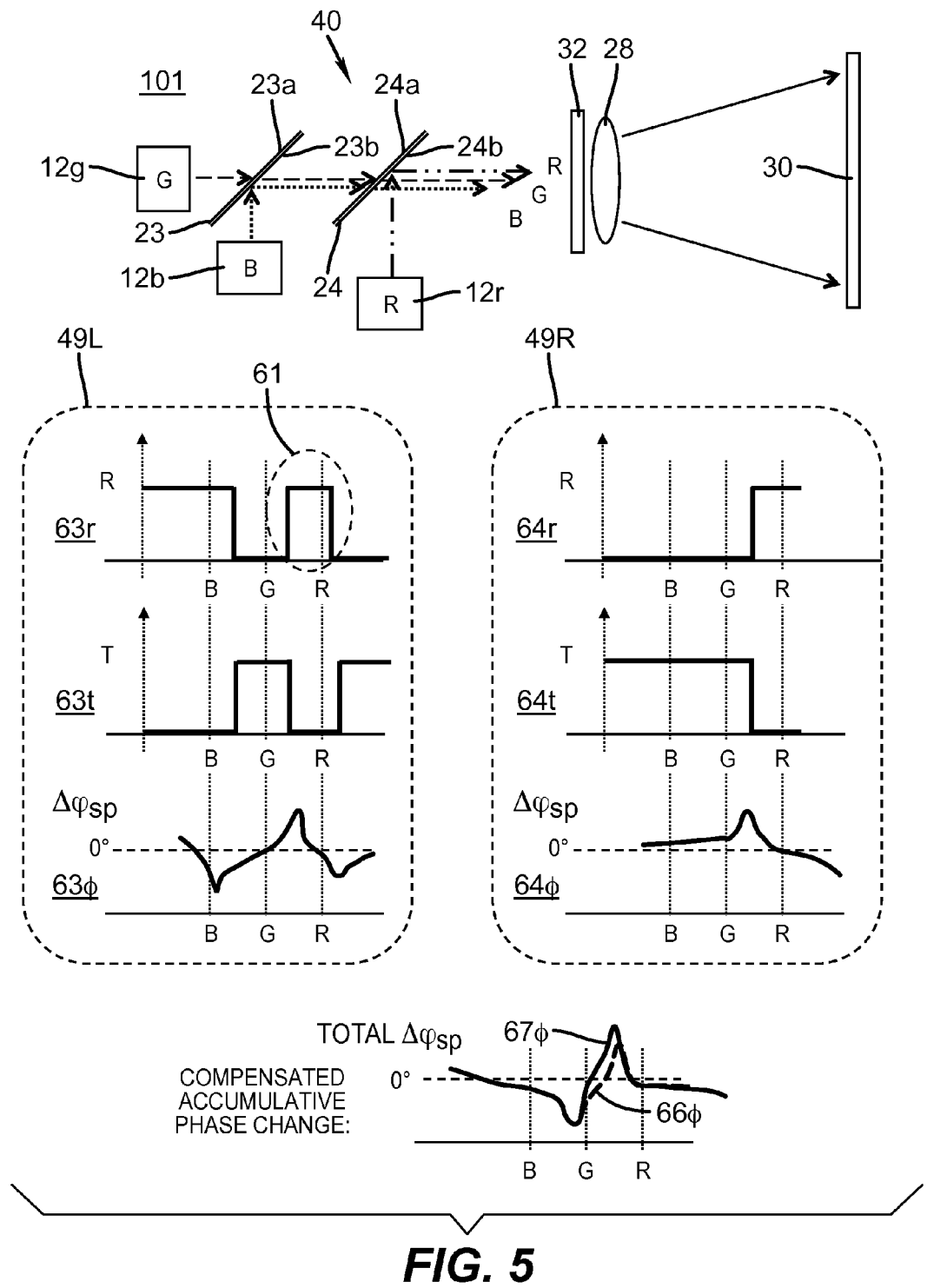
FIG. 5 is a block diagram showing phase compensation provided by the beam combiner coatings for the embodiment of FIG. 4.

Referring to FIG. 5, in order to compensate for the negative phase difference at the green wavelength, a phase compensating dichroic element is provided as notch filter with a phase compensating spectral bandpass 61, which is added to filter surface 23b of dichroic element (blue mirror) 23. Dichroic element 23 also has an anti-reflection surface 23a. On the left side of FIG. 5 in box 49L are a reflection filter graph 63r and a transmission filter graph 63t for filter surface 23b (blue mirror) of dichroic element 23 including the phase compensating spectral bandpass 61. A corresponding phase difference graph 62φ shows the phase difference $\Delta\phi_{sp}$. In this case, the phase compensating spectral bandpass 61 is provided with the compensating reflective edge transition ($\lambda_{edge}$) in about the yellow-orange spectral region (~580-600 nm) as shown. Referring back to the schematic system diagram, it can be seen that filter surface 23b does not receive incident light longer than the green wavelengths. Thus, adding a red reflective filter stack having the edge transitions and overall characteristics of phase compensating spectral bandpass 61 as shown in FIG. 5 has essentially no affect on the transmission or reflection of modulated light that is incident at this position in the optical path for imaging apparatus 101. However, this added structure, reflective of light at longer than green wavelengths, does have a beneficial impact on the phase change for the green light. On the right side of FIG. 5 in box 49R are a reflection filter graph 64r, a transmission filter graph 64t and a phase difference graph 64φ for filter surface 24b (red mirror) of dichroic element 24, which are identical to the corresponding graphs shown in FIG. 4. The resulting compensated accumulated phase difference $\Delta\phi_{sp}$ is shown at the bottom of FIG. 5 as a phase difference graph 67φ, shown overlaid with phase difference graph 66φ for comparison.

In the example of FIG. 5, it is instructive to note that the positive edge transition for the notch filter reflectance band shown as phase compensating spectral bandpass 61 provides useful phase-compensation. In an alternate embodiment, phase compensating spectral bandpass 61 is replaced by a phase compensating spectral high-wavelength pass filter having a positive edge transition ($\lambda_{edge}$) in the same place as that shown for the notch filter type phase compensating spectral bandpass 61 but having essentially no negative-going transition at higher wavelengths. It is the positive edge transition that performs the needed compensation for green light in the FIG. 5 embodiment, by canceling some of the phase differences $\Delta\phi_{sp}$ provided with the blue-green edge transition of the blue green combiner (dichroic element 23). Again, it should be observed that a negative edge transition in reflection is a positive edge transition in transmission.

As the examples of FIGS. 4 and 5 show, there can be a limited number of surfaces over which correction for phase shift can be applied, depending on the optical arrangement that is used for beam combiner 40. For example, a phase compensating dichroic element 52, whether a notch or edge filter providing a phase compensating spectral bandpass 61, operating in the red, cannot be added to filter surface 24b of dichroic element 24, since this surface already provides a red mirror in this system configuration.

In describing the prior exemplary phase compensated embodiments associated with FIGS. 3 and 5, the spectral reflectance or transmittance curves were presented in an idealized form that helped explain the inventive concept. To better illustrate the inventive concept, two detailed design examples will be given, as provided in the following discussions associated with FIGS. 8 and 9, and FIGS. 10 and 11, respectively.

Polarization Plane of Incidence Considerations

The orthogonal components of polarized light are classified with reference to an incident polarization plane. Referring again to FIG. 6, there is shown an optical element 80 receiving incident light 82 relative to a plane of incidence 84 and an X-Y-Z coordinate system. Light oscillating within plane of incidence 84 (X-Z plane) is considered to be p-polarized. Light orthogonal to plane of incidence 84 is considered to be s-polarized.

In the prior examples, for the FIGS. 1 and 3 embodiments dichroic elements 43 and 44/45 of beam combiner 40 both have the same plane of incidence for polarization. Likewise, for the FIGS. 4 and 5 embodiments, dichroic elements 22/23 and 24 both have the same plane of incidence for polarization. In particular, both dichroic elements are positioned at the same angles relative to the optical system, and thus are nominally parallel to each other. In such a case, the total phase difference $\Delta\phi_{tot}$ for the two surfaces is additive. That is, for surfaces 1 and 2:

$$\Delta\phi_{tot} = \Delta\phi_{sp} = \Delta\phi_1 + \Delta\phi_2 = (\phi_{s1} - \phi_{p1}) + (\phi_{s2} - \phi_{p2}) \qquad (4)$$

Figure 7:
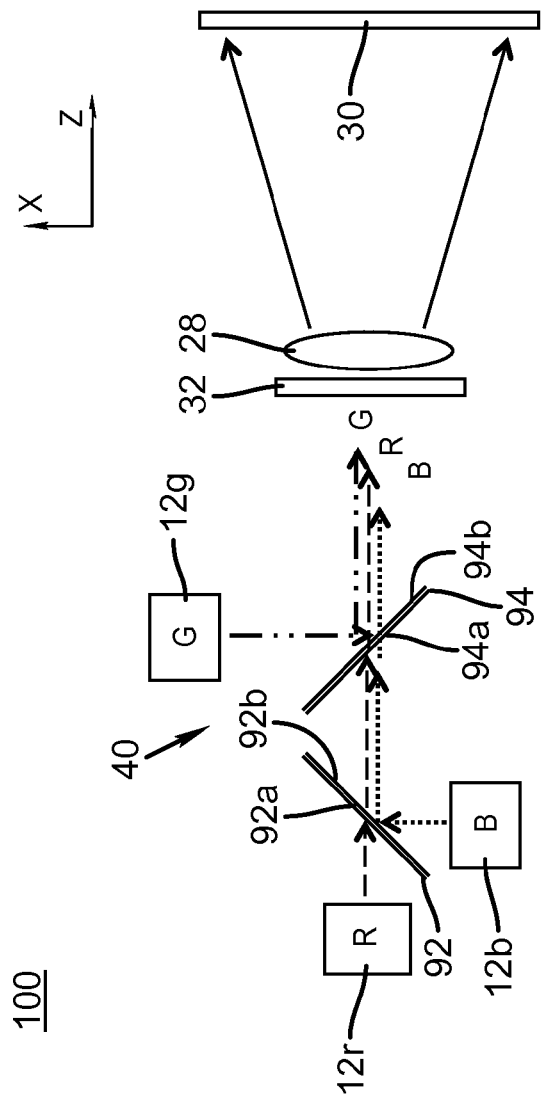
FIG. 7 is a schematic diagram showing an imaging apparatus having an orthogonal arrangement of polarization planes of incidence for color combiner surfaces.

However, in an alternate embodiment system of FIG. 7, the dichroic elements 92 and 94 of beam combiner 40 are tilted at opposite angles (in the XZ plane) so as to reduce the astigmatism experienced in imaging light through tilted plates. That is, the dichroic coated filter surfaces 92b and 94b are orthogonal, or substantially orthogonal (that is, to within ±15 degrees of orthogonal) to each other. These dichroic elements are also rotated at compound angles. In particular, considering FIG. 6, one dichroic is rotated by a nominal +45 degrees in the YZ plane (θx), while the other is rotated by a nominal −45 degrees in the YZ plane. This geometric orientation helps in orienting the image light coming from the DLP devices within the color channels 12r, 12g and 12b down a common optical (Z) axis as they enter projection lens 28. In this alternate embodiment, the total phase difference $\Delta\phi_{tot}$ for the two surfaces is the difference value:

$$\Delta\phi_{tot} = \Delta\phi_{ps} = \Delta\phi_1 - \Delta\phi_2 = (\phi_p - \phi_s) = (\phi_{p1} - \phi_{s1}) + (\phi_{p2} - \phi_{s2}) \qquad (5)$$

Figure 8:
FIG. 8 shows a set of graphs for surface reflectivity, phase difference in transmission, and phase difference in reflection for the embodiment of FIG. 7 prior to phase compensation.
Figure 8:
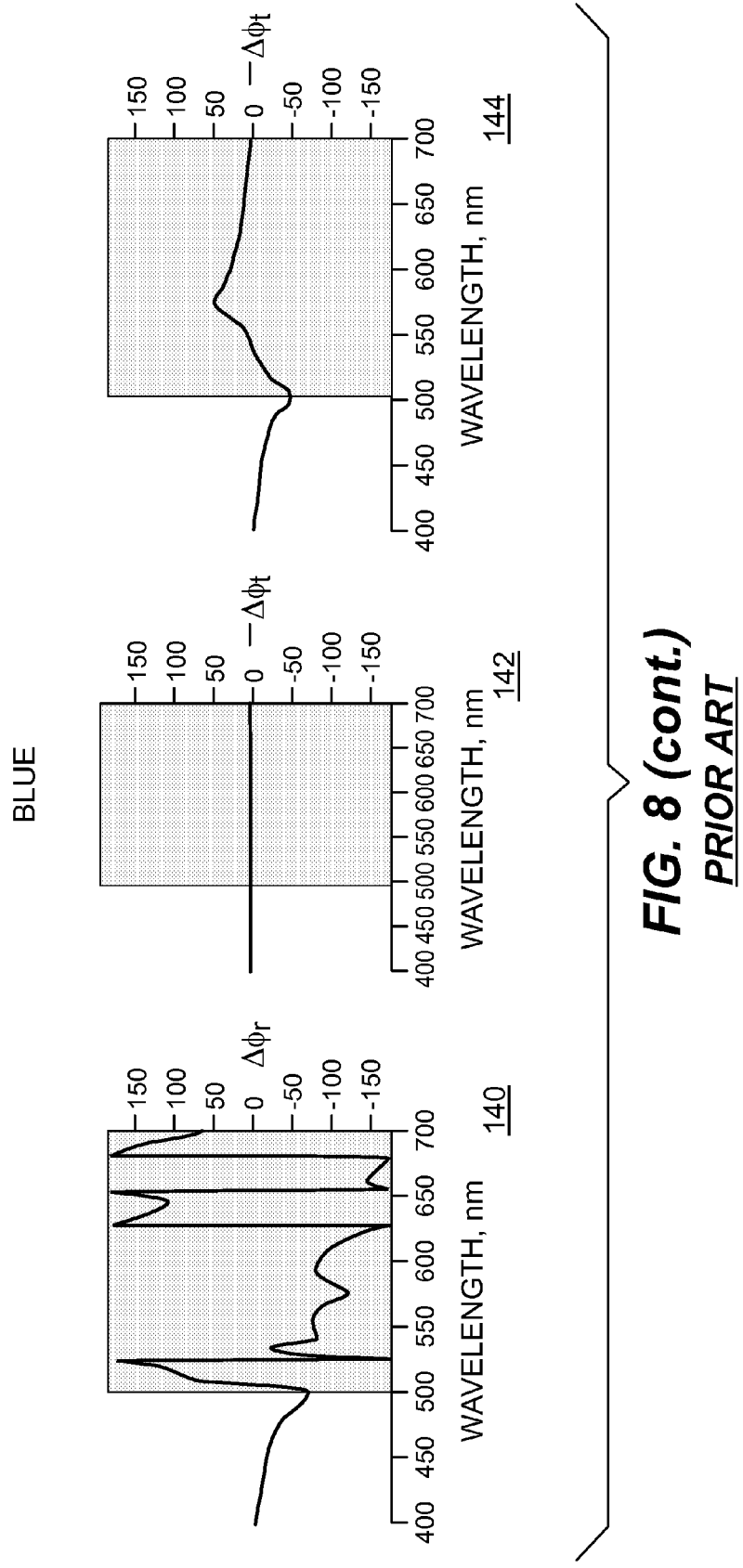
Figure 8:
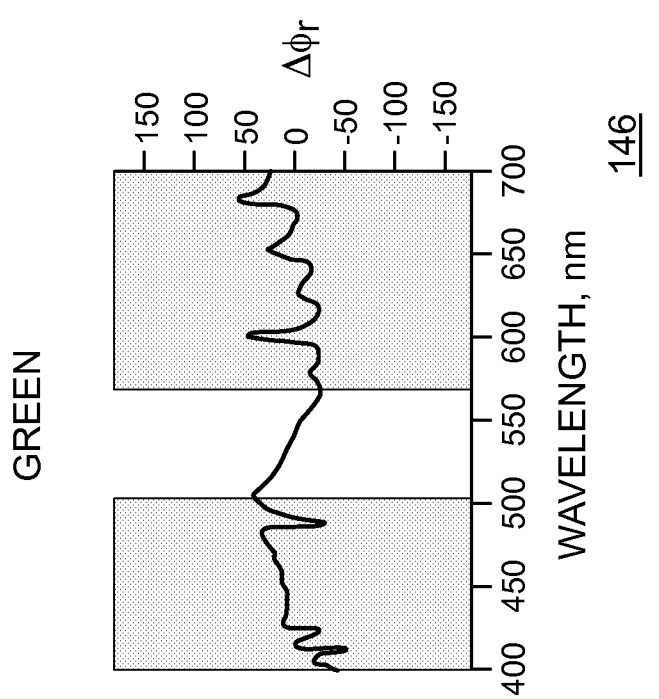

With respect to the system of FIG. 7, FIG. 8 presents detailed modeled performance for this system, designed with light incident at 35 degrees to the filter surfaces, with nominal target wavelengths $\lambda_o$ of 465 nm, 535 nm, and 635 nm for blue, green, and red wavelengths, respectively, but without the phase compensation method of the present invention. In particular, graph 120 shows the percentage reflectivity for the blue mirror of filter surface 92b. It is noted that anti-reflection surface 92a of dichroic element 92 has a typical AR-coating, as shown in graph 122. For dichroic element 94, a typical AR coating would be used for anti-reflection surface 94a, and a dichroic filter for the green mirror of filter surface 94b, respectively. The green mirror response is shown in graph 124. Note that in comparison to the example of FIG. 2A, the rejection bands (the green and red spectral regions of graph 120, and the blue and red spectral regions of graph 124) of FIG. 8 have little or no reflectance rippling.

Graphs 130, 132, 134, 140, 142, 144 and 146 of FIG. 8 show the phase change behavior $\Delta\phi$ of each component in the FIG. 7 embodiment. The "t" and "r" subscripts indicate whether the phase changes occur in transmittance or reflectance, respectively. In particular, graphs 130, 132, and 134 show the phase difference $\Delta\phi$ in degrees affecting red channel transmission through the blue mirror of filter surface 92b (graph 130), a typical AR coating as would be used for anti-reflection surfaces 92a and 94a (graph 132), and for light passing through the green mirror of filter surface 94b (graph 134), respectively. Graphs 140, 142, and 144 show the phase difference $\Delta\phi$ in degrees for reflectance of the blue mirror of filter surface 92b and transmission affecting blue channel light for the AR coating of anti-reflection surface 94a and for the green mirror of filter surface 94b, respectively. Graph 146 shows the phase difference $\Delta\phi$ in degrees for green channel reflection at filter surface 94b. The various regions of these graphs that are not relevant to the particular color bands have been grayed out for clarity.

Figure 9:
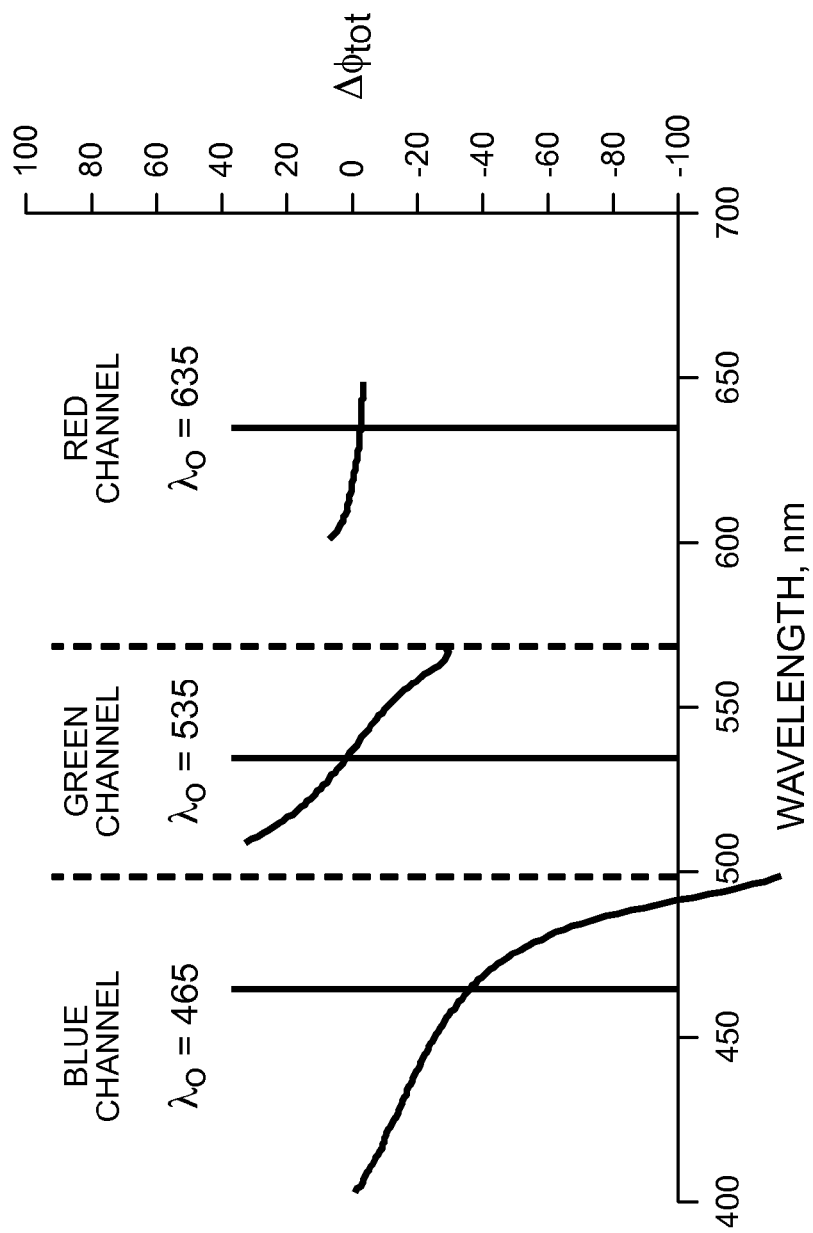
FIG. 9 shows the total phase difference per color channel for the un-corrected embodiment of FIG. 8.

The graph of FIG. 9 gives a summary of the total phase difference $\Delta\phi$ for each channel. As this graph shows, blue channel performance is the least satisfactory, with more than −25 degrees phase difference $\Delta\phi_{tot}$ at $\lambda_o$=465 nm. Performance in the green and red channels is much better, with near zero phase difference $\Delta\phi$ around $\lambda_o$=535 nm and $\lambda_o$=635 nm respectively.

Figure 10:
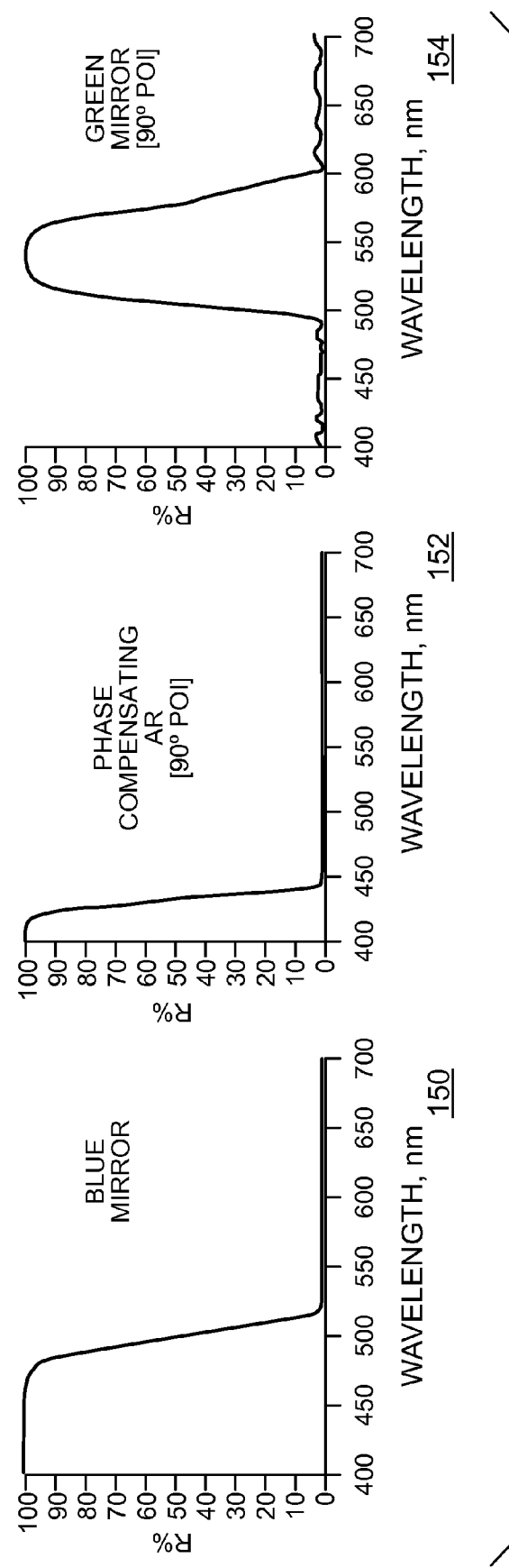
FIG. 10 shows a set of graphs for surface reflectivity, phase difference in transmission, and phase difference in reflection for the embodiment of FIG. 7 with phase compensation in one embodiment.
Figure 10:
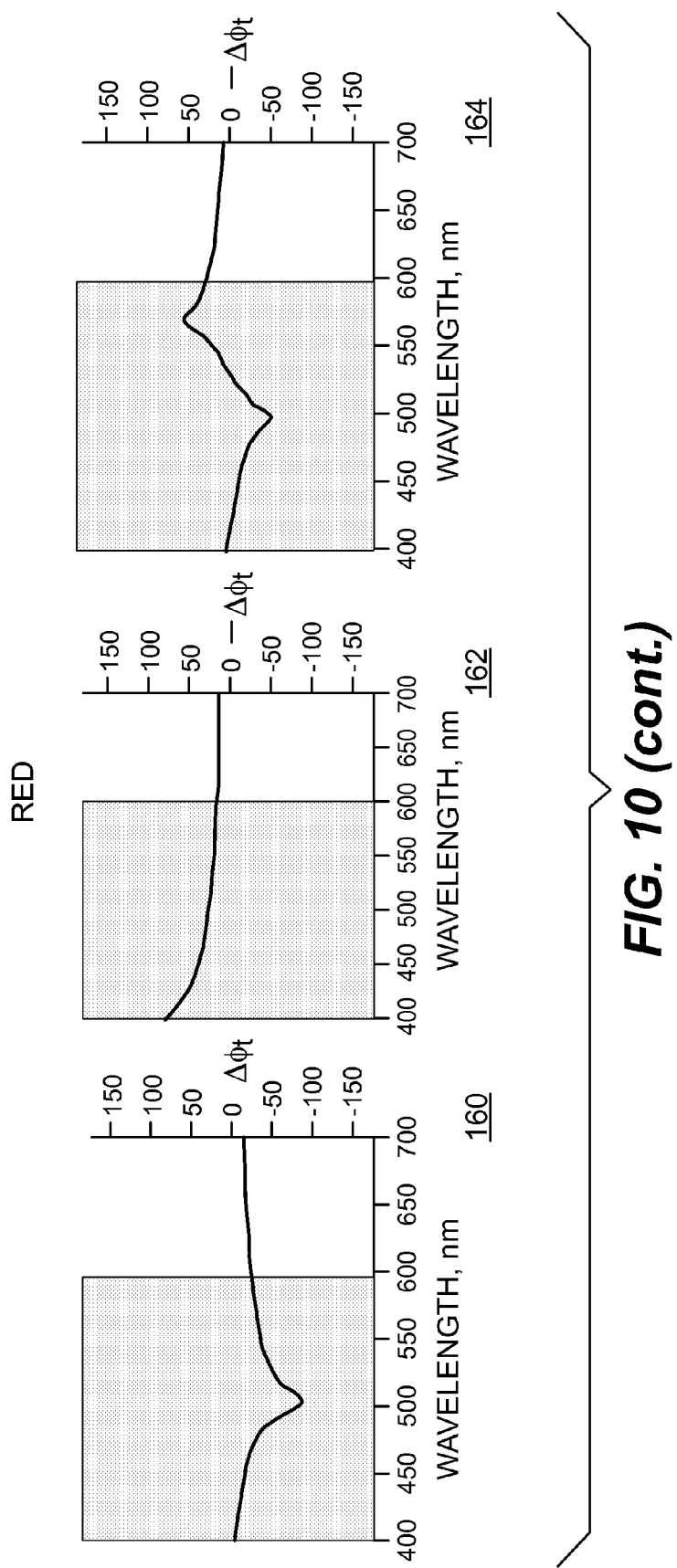
Figure 10:
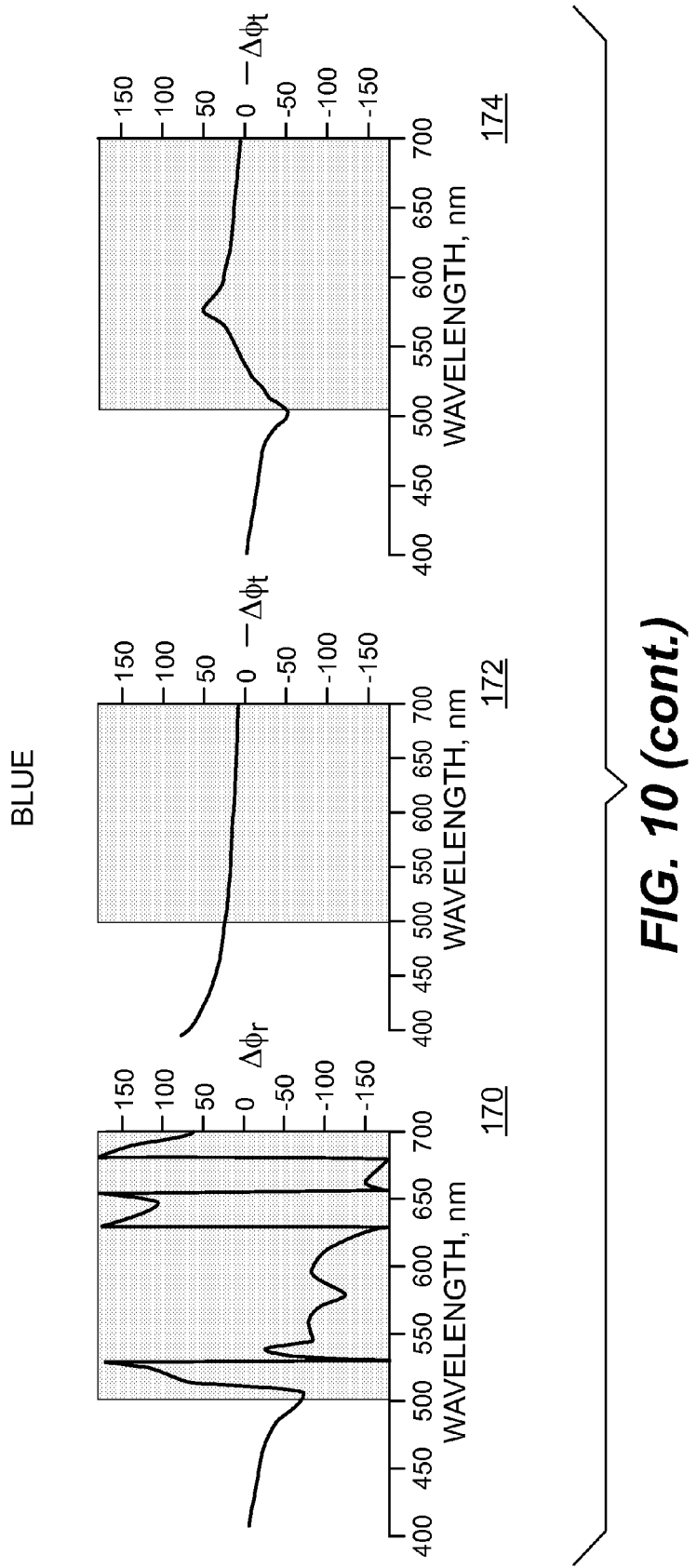
Figure 10:
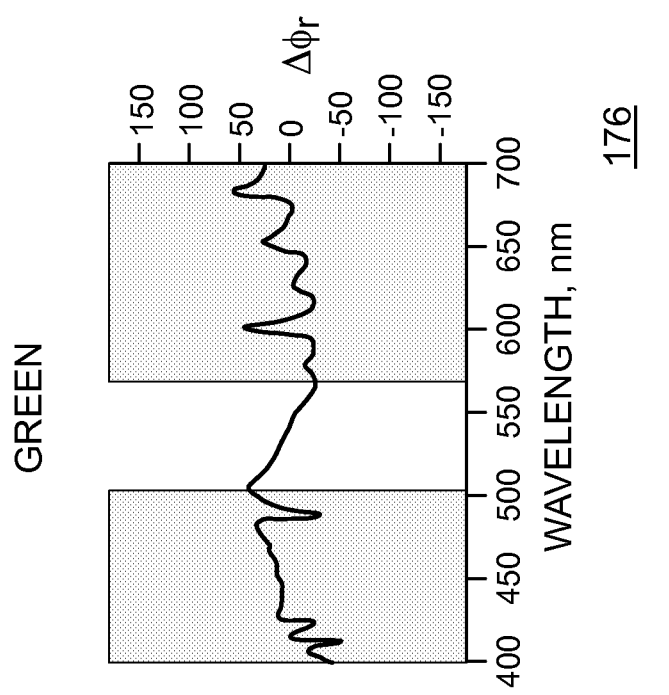
Figure 11:
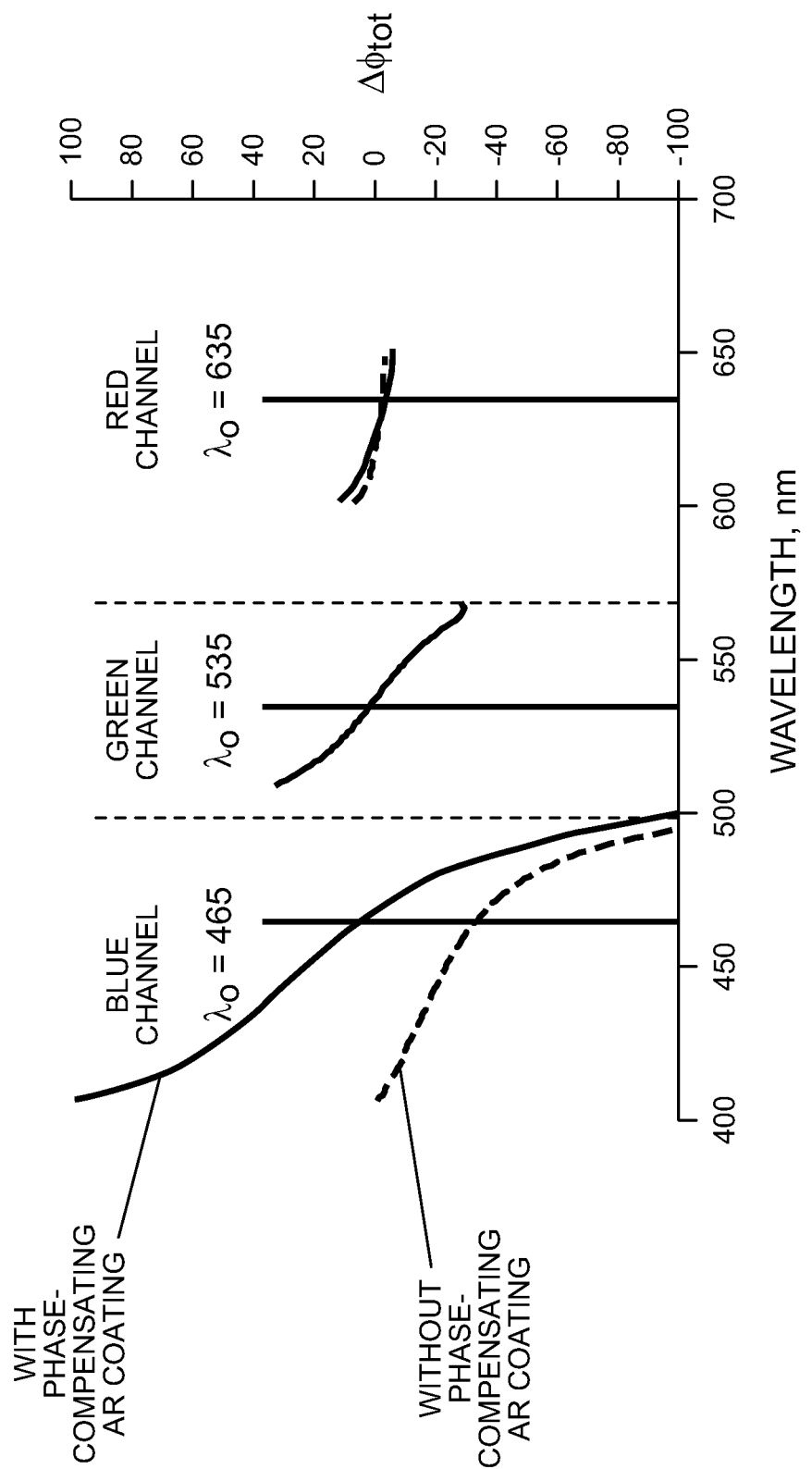
FIG. 11 shows the total phase difference per color channel for the corrected embodiment of FIG. 10.

FIG. 10 presents results for an alternate coating design for the FIG. 7 system according to the present invention. Here, a phase compensating reflective thin-film stack has been added to the anti-reflective coating on anti-reflection surface 94a of the second dichroic element 94. This difference can be seen by comparing graph 152 to graph 122 in FIG. 8. By comparison, there is no change to the blue mirror composition as shown in graph 150 relative to that shown in graph 120 of FIG. 8. Likewise, there is no change to the green mirror as shown in graph 154 relative to that shown in graph 124 of FIG. 8. Graphs 160, 162, 164, 170, 172, 174 and 176 in FIG. 10 show the phase difference $\Delta\phi$ thus provided to the orthogonal polarization-plane embodiment system of FIG. 7. Graphs 160, 164, 170, 174 and 176 are identical to the corresponding graphs in FIG. 8. Graphs 162 and 172, which show the impact on phase for the red and blue color channels respectively, are the only plots showing a change when FIGS. 8 and 10 are compared. Consistent with the basic principles described in reference to FIGS. 2A and 2B, the negative edge transition of the AR coating causes a net positive phase difference. As was described earlier, this inversion of the response described for FIG. 2A relates directly to the orthogonal disposition of planes of incidence in the FIG. 7 embodiment. The graph of FIG. 11 summarizes the results of the phase compensation and shows a comparison against the uncorrected case that was shown in FIG. 9. Here, it can be seen that blue channel performance is dramatically improved, with essentially zero degrees of phase difference at $\lambda_o$=465 nm. Red channel performance at $\lambda_o$=635 nm is excellent and slightly improved, with near zero phase difference. At the green target wavelength, $\lambda_o$=535 nm, the green channel provides essentially zero phase difference, although the slope of phase difference change is steep. Note that the spectral bandwidths having the target phase performance of within 10 degrees are about ±10 nm, which being much broader than laser bandwidths, indicates potential use of the present invention with other than laser light sources. The FIG. 11 results are exemplary only, and further refined coating designs to flatten the phase difference slopes and broaden the spectral bandwidths with reduced residual phase differences are possible. Note that the phase compensating AR coating of graph 152 did not affect the green channel, as this coating is on anti-reflection surface 94a, which is located at a position before green light is directed onto the common optical path.

Coatings Options and Strategies

The method and apparatus of the present invention provide a multilayer thin-film optical coating for light provided through a beam combiner, wherein the optical coating includes at least one added multilayer reflective filter structure, that is, an additional multilayer thin-film stack, that provides at least one band edge transition that lies outside the wavelength band of any of the individual light sources that are incident on the given thin-film stack and provides phase compensation to reduce the accumulative phase difference $\Delta\phi_{tot}$ for one or more of the wavelengths of the combined light sources. In order to provide this feature, the optical coatings design either intentionally adds a further reflective characteristic to an existing multilayer thin film filter stack or adds a supplemental coating structure to the surface of one or more components in the optical path to provide this reflective feature. As a guideline, the edge transition that provides phase difference compensation should lie within no more than ~100 nm ($\Delta\lambda_{offset}$) of the wavelength band ($\lambda_o \pm \Delta\lambda/2$) or the edge transition ($\lambda_{edge}$) being targeted for compensation. In order to reduce phase difference $\Delta\phi$ in one direction (positive or negative), one or more optical coatings are designed to provide a phase shift in the opposing direction, adding a reflective characteristic or feature to the filter design that is not otherwise useful to provide a filter function for combining modulated light.

From a coatings-design point of view, there is varying complexity for each of the basic optical filter types, any of which can be used as a phase compensating dichroic element 52. In part, this complexity relates to the number of band-edge transitions that must be provided and can generally be rated from the most difficult filter design to the least difficult as follows:

(i) Bandpass or notch filters. These dichroic coatings provide two band-edge transitions. It can be difficult to control the amount of ripple in the transmission or reflection characteristic curve between the two band-edge transitions.

(ii) Low-wavelength pass (low pass) edge filters. These filters have a single band-edge transition and are designed to reflect wavelengths above the edge transition and transmit wavelengths below the edge transition. For example, the so-called "hot" mirrors transmit visible light, and reflect IR light. It can be difficult to control ripple effects in the transmitted region for these designs.

(iii) High-wavelength pass (high pass) edge filters. Relatively ripple-free, these also have a single band-edge transition are designed to transmit wavelengths above the edge transition and reflect wavelengths below the edge transition. They include so-called "cold" mirrors which reflect visible light and transmit IR light.

In practice, seven or more layers are generally needed in order to form the simplest high-pass edge filter (iii); additional layers are typically used, particularly where the required filter response is more complex. By comparison, a conventional anti-reflective (AR) coating generally has about 3 layers.

For any reflective surface coating, there is a harmonic at ⅓ the wavelength of the band-edge transition. For a notch filter, this harmonic appears as a scaled version of the original notch filter. As was noted with respect to the example of FIGS. 1 and 3, this harmonic may result from an added notch filter in the IR region.

Coatings Design Tools

The coatings designer has a number of design parameters available for either increasing or decreasing the phase difference $\Delta\phi$ for multilayer thin-film surfaces, which can vary both in magnitude and characteristic of the phase profile changes they affect. These parameters affect the design or composition of the phase compensating dichroic elements 52. For example, these tools or design parameters for increasing the phase difference $\Delta\phi$ between s- and p-polarized light include the following:

a) Increasing the number of layers of dichroic material in the reflecting stack;

b) Increasing the index ratio of alternating high and low index (H/L) dichroic materials, $n_H/n_L$;

c) Increasing the incident angle for the light beams;

d) Decreasing indices of both high and low-index film components, $n_H$ and $n_L$, so that they are closer to the index of the medium $n_0$ (typically air or glass).

e) Controlling the relative position of the edge transitions ($\lambda_{edge}$) provided by the phase compensating edge or notch filters, as a distance ($\Delta\lambda_{offset}$) from the wavelength band ($\lambda_o \pm \Delta\lambda/2$) or spectral bandpass edge ($\lambda_{edge}$) of interest (see FIG. 2B).

f) Use of a harmonic of a phase compensation filter structure to provide phase compensation for a wavelength band.

Figure 12A:
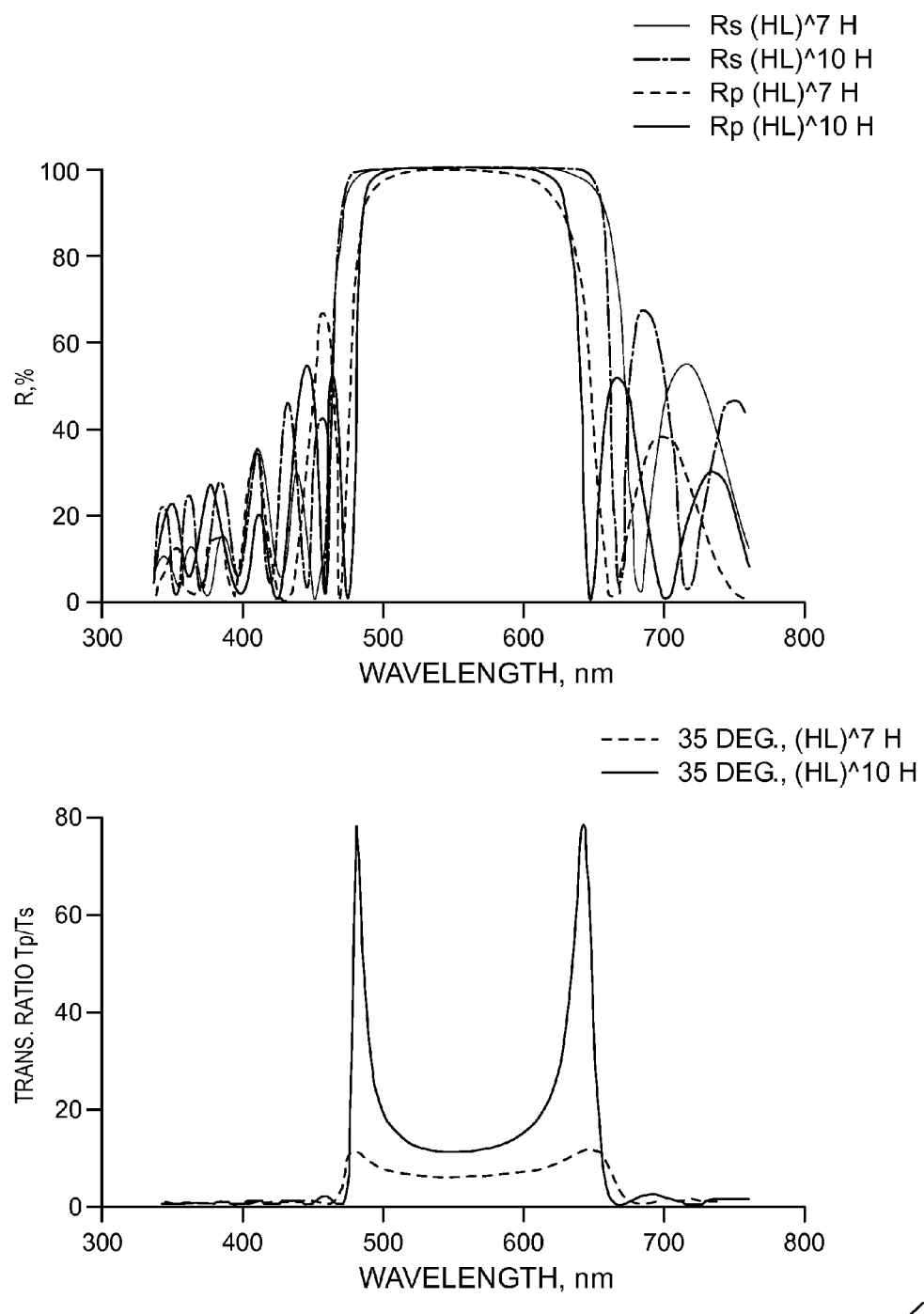
FIGS. 12A, 12B and 12C are graphs that show the results of a method for increasing phase difference by increasing the number of layers.
Figure 12B:
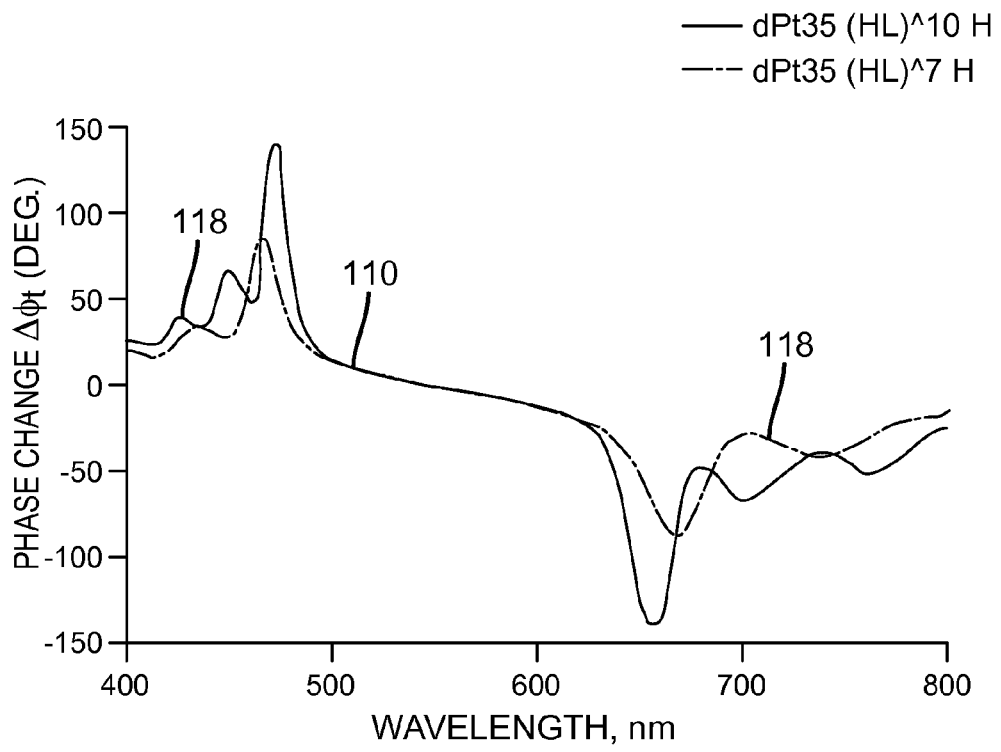
Figure 12C:
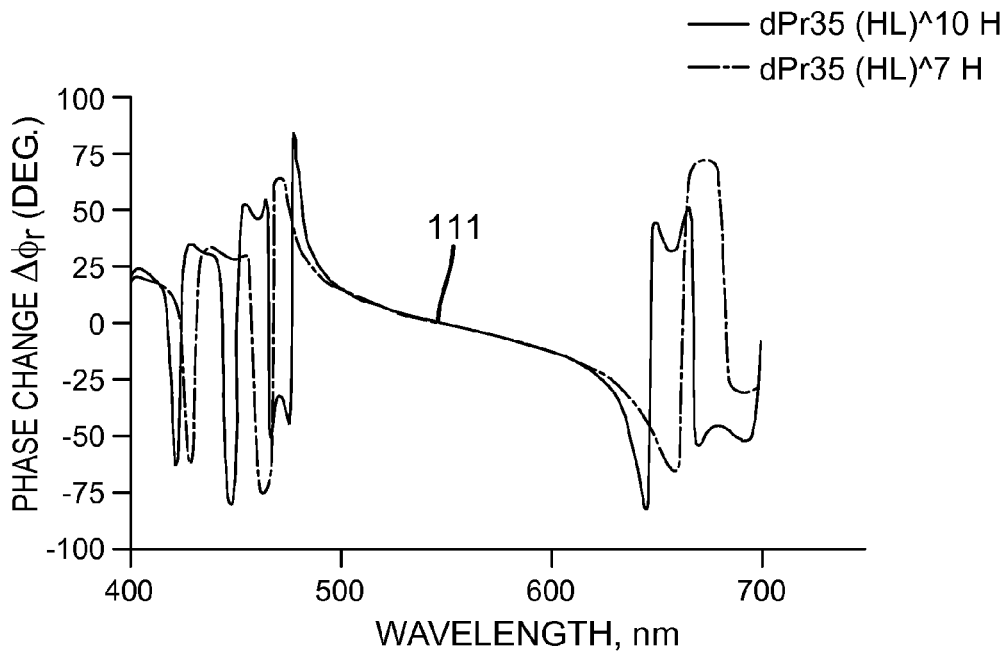

The graphs of FIGS. 12A-12C compare results for increasing phase difference by increasing the number of thin-film layers. A coatings design with refractive index values of $n_H = 2.30$ and $n_L = 1.46$ (index ratio $n_H/n_L = 1.57$) is used in this example. The top graph in FIG. 12A shows reflectance characteristic curves for s- and p-polarized light for the two configurations (using a 35 degree incidence angle), with the Rp curves being innermost and the Rs curves being outermost. The bottom graph in FIG. 12A shows the ratio of transmission between p- and s-polarized light $T_P/T_S$. FIG. 12B shows a phase difference profile 110 for the transmissive phase difference $\Delta\phi_t$, and FIG. 12C shows a phase difference profile 111 for the reflective phase difference $\Delta\phi_r$. In FIGS. 12B and 12C, the solid line curves indicate data for the design with the larger number of layers (10 pairs of high/low index layers), and the dashed line curves indicate data for the coating design with the smaller number of layers (7 pairs of high/low index layers). FIG. 12B shows the phase difference $\Delta\phi_t$ for transmission increased by about 50% from about 80 degrees maximum to about 140 degrees maximum with an expanded number of coating layers. However, the spectral bandwidth $\Delta\lambda$ or extent of the phase structure of the phase tails 118 remains approximately the same. FIG. 12C shows that the phase difference $\Delta\phi_r$ for reflection is dominated by a complex structure of high amplitude ripples, which can shift significantly (by as much as 20 nm or more) in spectral position.

Figure 13A:
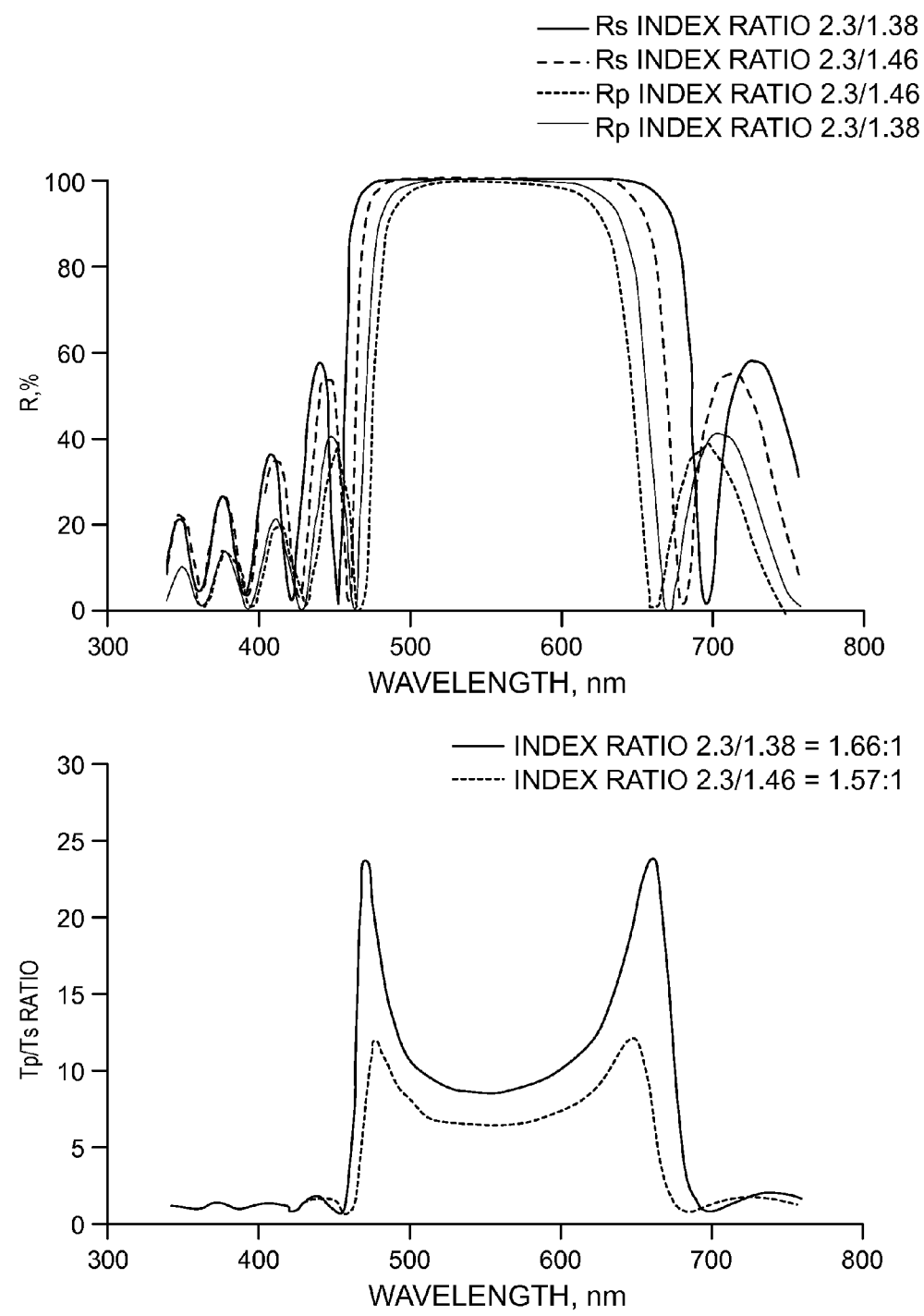
FIGS. 13A, 13B and 13C are graphs that show the results of a method for increasing phase difference by increasing the ratio of indices of refraction.
Figure 13B:
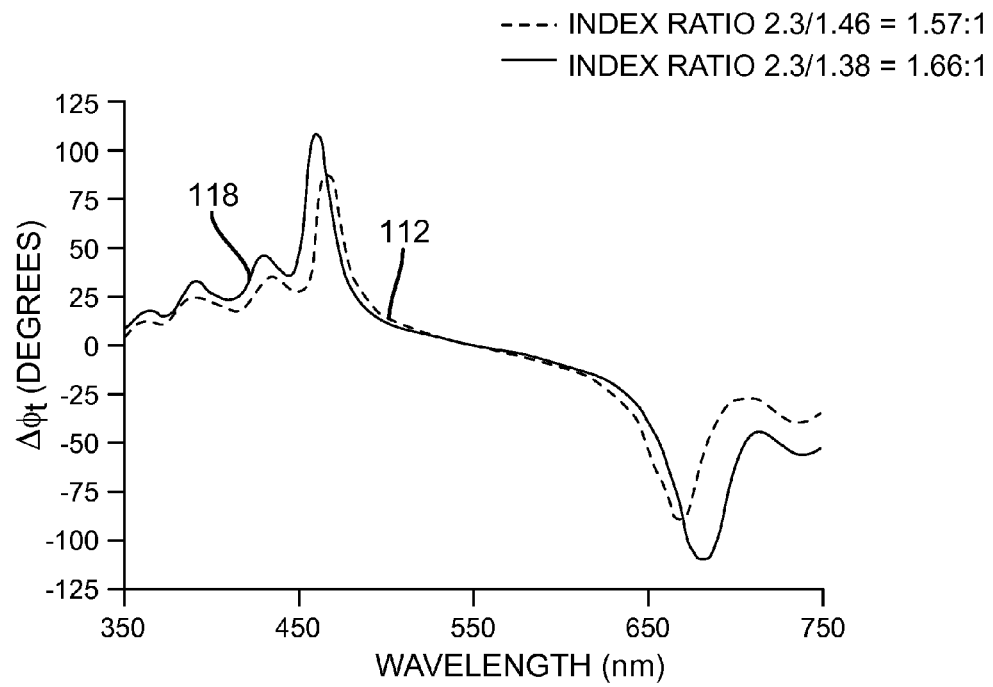
Figure 13C:
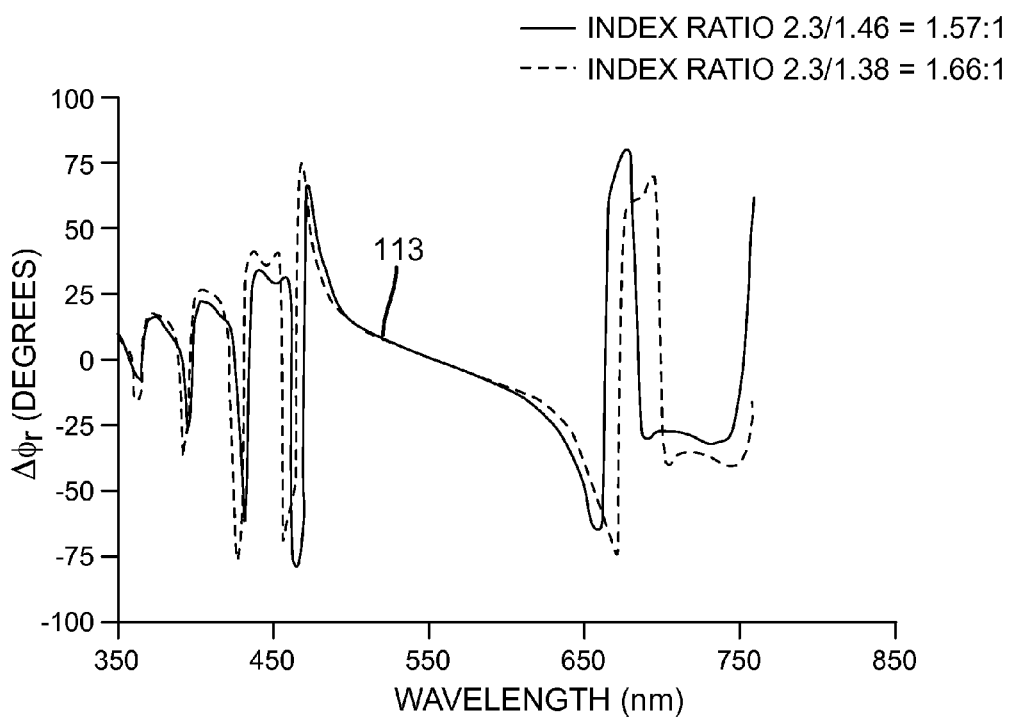

The graphs of FIGS. 13A-13C compare results for increasing the index ratio of alternating high and low index dichroic materials, $n_H/n_L$, comparing results for a larger index ratio ($n_H/n_L = 2.30/1.38 = 1.66:1$) to those for a smaller index ratio ($n_H/n_L = 2.30/1.46 = 1.57:1$). The top graph in FIG. 13A shows reflectance characteristic curves for s- and p-polarized light for the two configurations (using a 35 degree incidence angle). The bottom graph in FIG. 13A shows the ratio of transmission between p- and s-polarized light $T_P/T_S$. FIG. 13B shows phase difference profiles 112 for the transmissive phase difference $\Delta\phi_t$, while FIG. 13C shows a phase difference profiles 113 the phase difference $\Delta\phi_r$ for reflection. In FIG. 13B, the phase difference profiles 112 of the transmissive phase difference $\Delta\phi_t$, show small changes in the amplitude (about 30%) and position and extent of the phase difference profile features (including phase tails 118) with changing refractive index ratios. In FIG. 13C, the phase difference profiles 113 the reflective phase differences $\Delta\phi_r$, again show spectral shifts with modest differences.

Figure 14A:
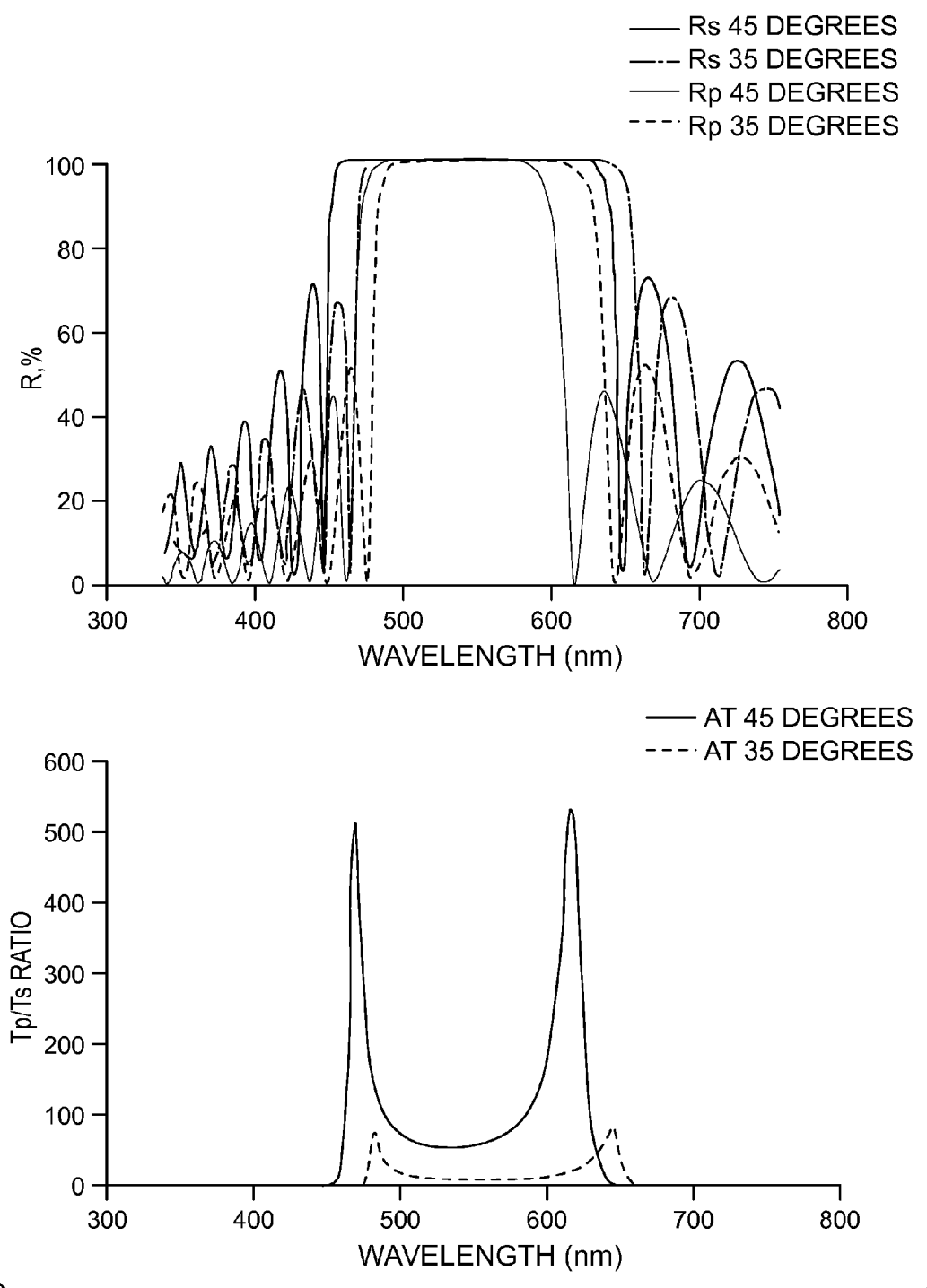
FIGS. 14A and 14B are graphs that show the results of a method for increasing phase difference by increasing the angle of incident light.
Figure 14B:
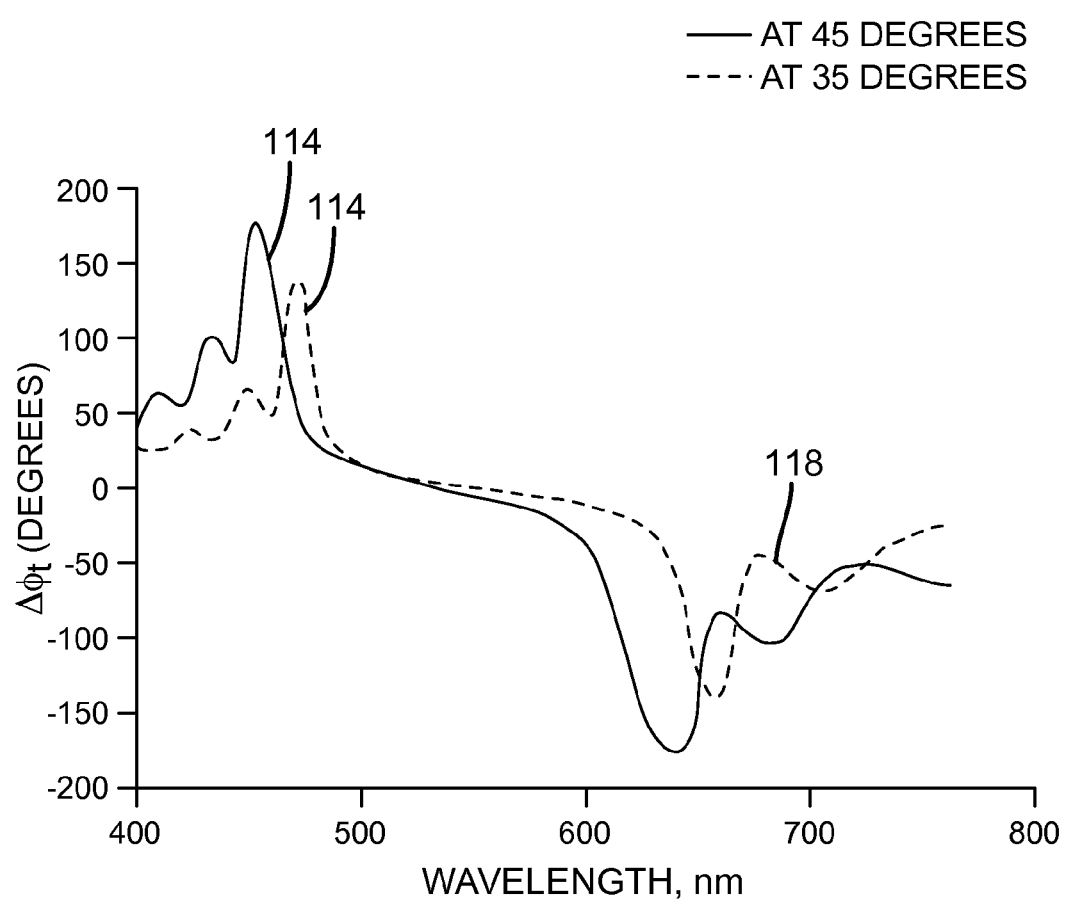

The graphs of FIGS. 14A and 14B compare results for increasing the incident angle from about 35 to 45 degrees. The solid line graphs indicate data for the larger incident angle (45 degrees). The dashed line graphs indicate data for the smaller incident angle (35 degrees). The top graph in FIG. 14A shows reflectance characteristic curves for s- and p-polarized light for the two configurations. The bottom graph in FIG. 14A shows the ratio of transmission between p- and s-polarized light $T_P/T_S$. FIG. 14B shows phase difference profiles 114 for the transmissive phase difference $\Delta\phi_t$, and shows significant differences in the peak phase difference, with approximately 30% change, from near 140 degrees to near 175 degrees. There is also a significant change in the peak phase difference spectral position (about 20 nm), and in the phase difference ripples of the phase tails 118 across the spectral band near the edge transition, with the higher incident angle case providing larger phase differences in magnitude and extent.

Figure 15A:
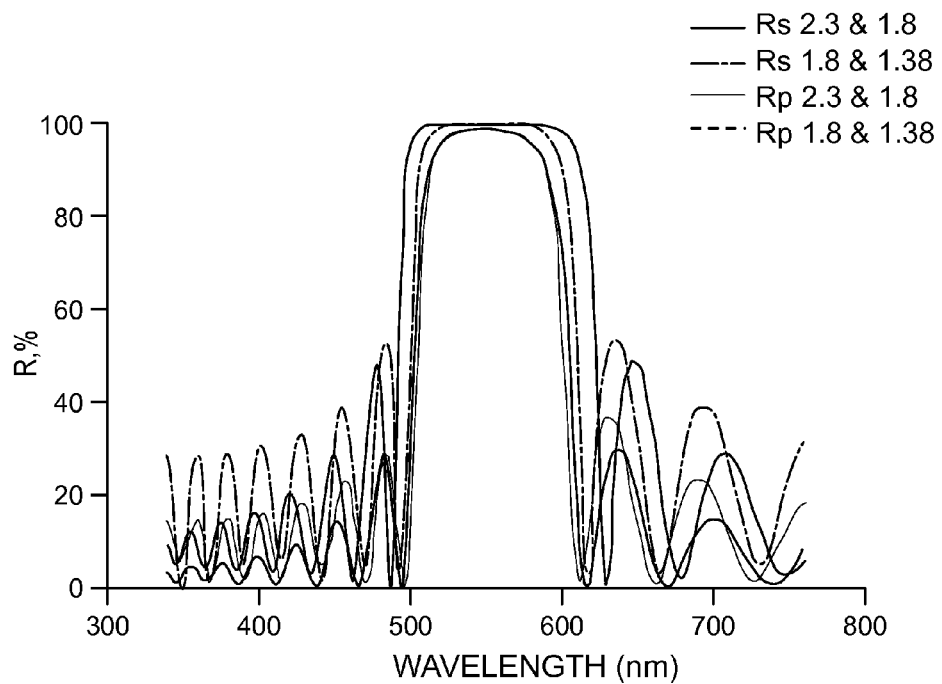
FIGS. 15A and 15B are graphs that show the results of a method for increasing phase difference by decreasing indices of refraction used to form alternating thin-film layers, relative to the propagation medium.
Figure 15A:
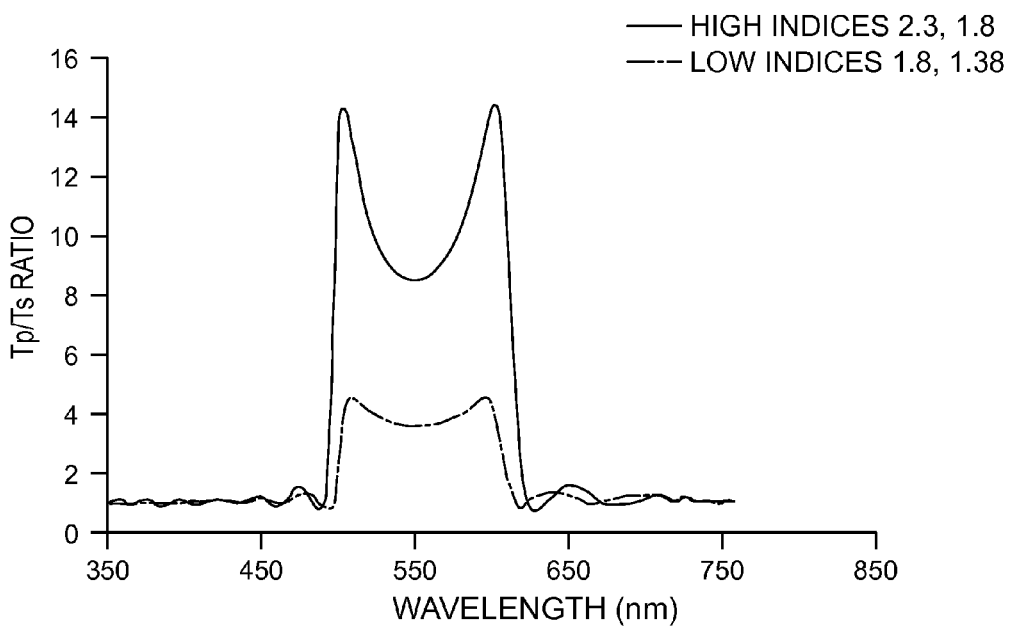
Figure 15B:
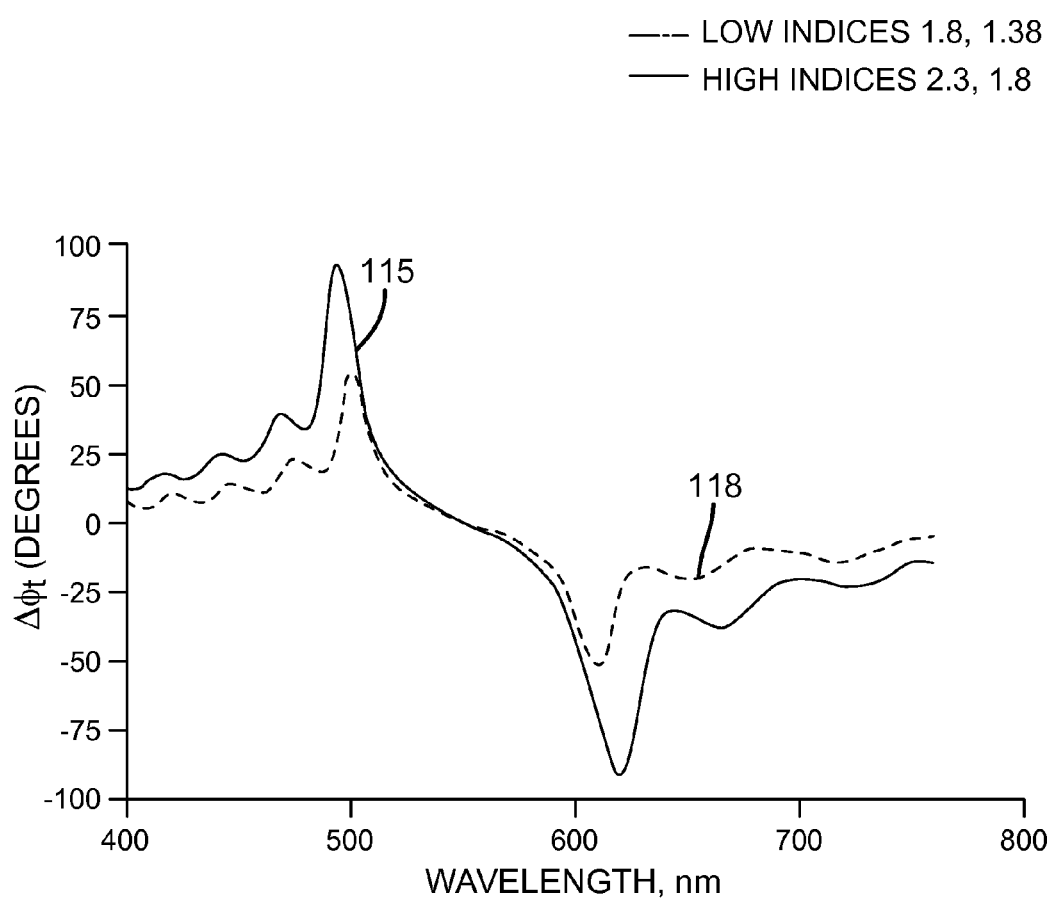

The graphs of FIGS. 15A and 15B compare results for reducing the indices of both high and low-index film components, $n_H$ and $n_L$, so that they are closer to the index of the substrate medium $n_0$. For this example, a coating design higher index of refraction values ($n_H$=2.30 and $n_L$=1.8) is compared to a design with reduced index of refraction values ($n_H$=1.80 and $n_L$=1.38). The top graph in FIG. 15A shows reflectance characteristic curves for s- and p-polarized light for the two configurations. The bottom graph in FIG. 15A shows the ratio of transmission between p- and s-polarized light $T_P/T_S$. FIG. 15B shows phase difference profiles 115 for transmissive phase difference $\Delta\phi_t$ that show significant differences in the peak phase differences (with about 50% change) and phase difference ripples of the phase tails 118 across the spectral band near the edge transition, with the higher index pair providing larger phase differences in magnitude and extent.

Concerning Harmonics

Two kinds of harmonics deserve consideration; those of the primary coatings and those of the phase compensating filters. In general, multilayer coatings (stacks) made with 2 materials will have the following orders based on the ratio of alternating high and low index (H/L) dichroic materials;

A 1:1 ratio—1st order present, no second order harmonic, third order present, no fourth order harmonic, fifth order potentially present, ...

A 2:1 ratio—1st order present, second order present, no third order present, fourth order present, ...

A 3:1 ratio—1st order present, second order present, third order present, no fourth order present, ...

These ratios are ratios of the optical thicknesses (nd) of the high (H) and low (L) index materials, where n is the refractive index and d is the physical thickness. In commonly used coating nomenclature, an upper case letter represents a quarter wave layer with a particular index of refraction. For example, an "H" represents a quarter wave optical thickness (QWOT) of a high index material, an "L" represents a QWOT of a low index material, and an "M" represents a QWOT in an intermediate index material. A QWOT is defined as the optical thickness at which a film is 0.25 wavelengths thick, or:

$$QWOT = nd = \lambda/4 \qquad (6)$$

Using this nomenclature, a layer of the high index material that is only an eighth wave thick is designated as 0.5H or H/2, while a layer that is a half wave thick would be designated as 2H. The thin film stacks of optical or dichroic coatings typically comprise a multitude of QWOT layers, or fractional or multiple of QWOT layers, often including layers formed with a repeating pattern.

Given this, an exemplary high wavelength pass edge filter having a 1:1 ratio can have a $(0.5L\ H\ 0.5L)^m$ thin film stack layer arrangement, while an exemplary low wavelength pass edge filter can have a $(0.5L\ H\ 0.5L)^m$ thin film stack layer arrangement, where m is an exponent indicating repetition of the pattern of high/low index layers. An exemplary 2:1 ratio high reflector stack has a $(1.33H\ 0.66L)^m\ 1.1H$ thin film stack layer arrangement. Of course, intermediate optical thickness ratios can occur. At a ratio of 1.10:1, a very small second order starts to appear (increasing reflectivity), while the third order starts to diminish (decreasing reflectivity). The closer we get to 2:1, the more the second order will grow and the third order disappears.

Consideration is first given to inherent harmonics of the primary dichroic coatings. While these inherent harmonics can contribute phase differences of the opposite sign to the phase differences provided by the primary optical coating, phase cancellation or phase neutrality is not assured. The positions of any inherent (and not suppressed) harmonics of the primary coatings occur at wavelengths dictated by simple mathematics, and their positions cannot be adjusted. Additionally, the width of higher order harmonics is reduced relative to the first order (a fifth order harmonic will have a width $1/5^{th}$ the width of the first order bandpass). Coating asymmetry versus wavelength, which reduces the extent of the phase tails in the UV, compared to the visible or IR, also reduces the potential for phase cancellation from inherent harmonics. Thus, at shorter wavelengths, where the potentially useful harmonics are occurring (in the UV), less distance ($\Delta\lambda_{offset}$) is desirable, but the potential offset distances (>100 nm) tend to be overly large. Taken together, this means that the position of the edge transition ($\lambda_{edge}$) and the overlap of the phase difference profile, are essentially uncontrolled, and phase cancellation is unlikely to occur. The residual phase may be higher or lower than the residual phase difference without the harmonic.

This can be illustrated by example. In many of the prior design examples, the green channel has been introduced through the dichroic combiner using a primary coating that is a green pass band notch filter. This notch filter can be provided as a first order, second order, or third order filter, for example. If the notch is provided as a first order filter centered at 532 nm, with a target pass band width of ~65 nm or less, then potential second or third order harmonics would occur at 266 nm and 177 nm respectively. These harmonics are too distant ($\Delta\lambda_{offset}$>100 nm) to help with phase difference compensation, even for typical blue imaging spectra.

Alternately, if the green notch filter is provided as 2nd order filter, the coating stack will be provided at 1064 nm, to get the second order harmonic at 532 nm. If that design produces a third order harmonic, it will be in the ultraviolet (UV) at 354 nm. The first order will be too distant to help with phase compensation, and the third order is borderline ($\Delta\lambda_{offset}$~100 nm) relative to its proximity to desirable blue imaging wavelengths (440-480 nm). As yet another alternative, if the green notch is provided as a third order filter at 532 nm, the first order would be at 1596 nm, and the fifth order will be in the UV at 319 nm. As with the prior example, there is a harmonic (in this case the fifth order harmonic at 319 nm) that is borderline distant ($\Delta\lambda_{offset}$~140 nm) to help with phase difference compensation. As the goal is to reduce phase differences to less than ±10 degrees on a repeatable basis, inherent harmonics of the primary coatings are unlikely to help, particularly in the visible range.

Consequently, it can be seen that phase neutrality does not occur naturally, but is a result of both deliberate system design and coating design. To begin with, the design of a dichroic element, together with the geometry of the combiner, must provide the correct colors (wavelengths) to the correct surfaces to obtain phase cancellation, rather than unintended and undesirable phase interactions by providing the wrong colors to the wrong surfaces. Additionally, phase cancellation occurs as a result of knowledge of the phase performance of the primary coating, as well as the phase response of the phase compensating thin film stack, the latter of which depends on the wavelengths chosen ($\lambda_{edge}$, $\Delta\lambda_{offset}$), and the characteristics of the phase difference profiles 50, including the phase tails 51. As discussed previously, the phase difference profiles 50, including the phase tails 51, depend on the number of coating layers, the refractive indices and index ratio, and the incidence angles and wavelengths ($\lambda_o$, $\Delta\lambda$) of the incident light. Small changes in any of these characteristics can prevent the compensation coating from achieving the design targets to provide residual phase differences $\Delta\phi$ that are zero, or at least <±10 degrees. As an example, material property variations, including dispersion and absorption, also typically change coating behavior at shorter wavelengths (particularly in the UV). Additionally, these coating design parameters must be used carefully, so that the designed performance can be reliably achieved during fabrication.

By comparison, the present invention provides that a phase difference compensation multilayer thin-film stack can be designed to make deliberate use of a harmonic of the phase compensating dichroic element 52. In the design example of FIG. 3, a phase compensating spectral bandpass notch filter was introduced in the red-IR wavelength region was discussed. Expanding on that example, the phase compensating notch filter may have a rising (red) edge transition at ~685 nm to help with red phase (and possible green) compensation. The center wavelength for this filter could be at 740 nm, for a band pass of 110 nm wide. If this filter has a 2:1 optical thickness ratio, a second order UV-blue harmonic could occur at 370 nm, with falling edge transition at ~395 nm, for a relatively small offset ($\Delta\lambda_{offset2}$~70 nm), that can provide phase cancellation in the blue at 465 nm.

As this previous example illustrates, tuning the spectral size and positioning of the phase compensating dichroic element 52, to also provide a harmonic of that phase compensating filter in the right spectral position to provide phase compensation as well, is a tricky task. Successfully providing phase compensation for a wavelength of interest using a harmonic of a primary coating is even more difficult even when attempted deliberately. The use of a harmonic of a primary coating for phase compensation has greater potential for applications with expanded spectra, such as an application in which the visible and a portion of the near IR are both imaged.

It is also recognized that the phase response provided by an inherent harmonic of the primary coating (such as a harmonic in the 300-400 nm UV spectral range) can interact with the intended phase response provided by a harmonic of the phase compensating dichroic element 52, even if the two coatings are on different surfaces. This interaction may be hard to predict or control. Therefore, it is useful to suppress harmonics of the primary coating that can occur in spectral regions overlapping with the phase compensating filter (or a harmonic thereof). In particular, spectral overlap near edge transitions intended to provide phase compensation can be problematic. Fortunately, it is possible to suppress harmonics, including those of the primary coating. Harmonic suppression can be achieved by adding a third material to the design. For example, instead of an (0.5L H 0.5L) design for an edge filter, an alternate style (0.25L 0.25M H 0.25M 0.25L) of design can be used. As the materials and optical thickness ratios are changed, different harmonic orders are suppressed.

Systems Considerations

It is also noted that the design of a phase compensated dichroic combiner or separator can be regarded as a systems design exercise. While the phase compensating dichroic element 52 can be effectively designed using the various coating tools described previously, phase reduction can be impacted by a variety of factors. In the example associated with FIG. 5, the application of phase compensating filter with an edge transition in the yellow-orange region of the spectrum took advantage of the system geometry, in which the red channel 12r had not yet been introduced. With respect to harmonics, harmonics of the primary coating can either be deliberately suppressed to prevent interactions with a phase compensating filter or deliberately positioned in an advantageous fashion to provide phase compensation. The spectral characteristics (spectral pass band region, at least one edge transition, and an associated phase difference response) of a primary coating can also be tuned to reduce phase differences, or to provide phase differences (magnitude and sign) at the target wavelengths ($\lambda_o$, $\Delta\lambda$) of the incident light that are more readily corrected by a phase compensating filter.

Likewise, the phase response to the different coating tools (including number of layers, index ratios, high or low indices, and incident angle) varied significantly depending on the tool. While incident angles are likely fixed by systems design considerations, the coating designer is likely freer to manipulate the other parameters to achieve the desired results. The use of phase compensating dichroic elements 52 where the compensating optical coating is used in transmission, can be preferable over coatings used in reflection, as the phase difference responses can more readily be tuned and repeatably fabricated, as the high frequency rippling is absent (compare reflective phase graphs in FIGS. 12B, 13B, 14B, and 15B to transmissive phase graphs in FIGS. 12C and 13C).

Obtaining a Phase-Compensated Design

Figure 16:
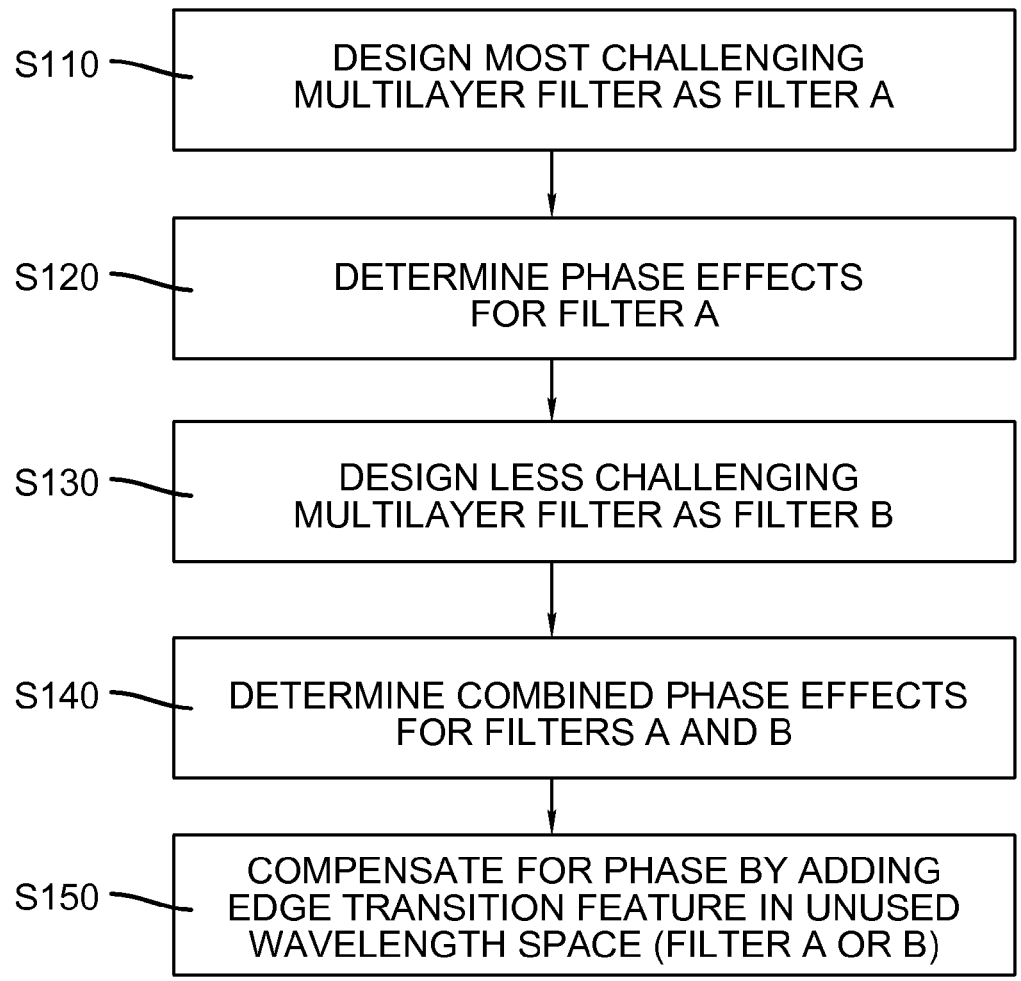
FIG. 16 is a logic flow diagram that shows a sequence of steps for designing beam combiner coatings in one embodiment.

The logic flow diagram of FIG. 16 shows an exemplary design process comprising a set of basic steps that are followed for obtaining a phase-compensated design for two or more combiner dichroic films in one embodiment. In an initial design step S110, the most challenging filter design (filter A) is tackled first. The level of difficulty of the design is based on factors such as filter type, as outlined earlier, and wavelength of incident light. No attempt is made at first to correct for phase differences that affect s- and p-polarization handling during initial design step S110. A phase assessment step S120 follows, in which the phase effects for filter A are measured or calculated. A second design step S130 is then executed, in which the less challenging multilayer filter (filter B) is designed. A second phase assessment step S140 follows, in which the accumulative phase differences for the combination of filters A and B are measured or calculated. A phase compensation step S150 is then executed to apply phase compensation for the accumulative phase differences of filters A and B. In general, it is easier to apply phase compensation to the less challenging filter design or to some related surface, such as an AR surface of a dichroic element, for example. The techniques described earlier with reference to FIGS. 12A-15B can be applied to yield the desired amount of phase compensation.

Example 1

By way of example, tables in FIGS. 17A, 17B, and 17C detail a thin-film layer design for providing the phase difference compensation described earlier with reference to FIG. 3. FIG. 17A shows the composition of the blue mirror of filter surface 43b, with identification of layer order, layer material, and layer thickness (in nanometers). The FIG. 3 embodiment includes a phase compensating spectral bandpass 60 in the red-IR wavelength range. In one configuration, the phase compensating spectral bandpass 60 can be provided as a "hot mirror" type reflective surface stack (reflects IR, transmits visible) added to the anti-reflection coating on anti-reflection surface 45a. FIG. 17B shows the composition of a phase-compensating AR-coating that can be used to provide this feature. FIG. 17C gives the layer listing for the green notch filter of filter surface 45b. The thin-film materials are encoded as follows:

A—TiO2
B—Y2O3
C—Al2O3
D—MgF2
H—ZrO2
L—SiO2

It can be noted that the addition of the needed reflective properties to the AR coating adds significantly to the number of layers. Typical AR coatings require only 3 coatings. However, the improvement in the phase compensation justifies the additional complexity and cost for many applications.

Example 2

Tables in FIGS. 18A, 18B, and 18C show an example of the alternate embodiment described earlier with reference to FIGS. 7-10, in which the two filter surfaces 92b and 94b have mutually orthogonal polarization planes of incidence. Here, compensation for phase difference is provided by a UV-low blue reflective feature (mirror) that is added to the AR coating of anti-reflection surface 94a (FIG. 7). Accordingly, FIG. 18B shows the composition of an appropriate phase-compensating AR-coating that can be used to provide this feature. FIG. 18A gives the layer arrangement for the blue mirror of filter surface 92b (FIG. 7), and FIG. 18C shows the layer arrangement for the green notch filter of filter surface 94b (FIG. 7).

Additional Considerations

Those skilled in the optical coating arts will recognize that there can be numerous ways to design a beam combiner from a combination of dichroic elements and that various coating formulations can be used for providing multifilm spectral filters, such as those described herein.

Examples and description provided herein have been primarily directed to beam combiners used for image projection using lasers of red, green, and blue wavelengths. It should be noted that the apparatus and methods of the present invention can be more broadly applied to other types of imaging device as well, including those using additional colors, and to other systems that combine or separate light using multilayer thin-film dichroic surfaces.

While the present description primarily addresses the use of lasers or solid-state light sources, the apparatus and method of the present invention can also be used with imaging apparatus that use other light sources, such as Xenon arc light sources, for example. It must be noted that the approach used in the present invention is particularly well suited for use with solid-state light sources that have narrow wavelength bands, since this narrow-band Δλ characteristic more readily allows addition of reflective structures that reflect at wavelengths that are distinct from those of the modulated light. This is more easily done when narrow wavelength bands are provided, such as using solid-state light sources, rather than when broader wavelengths are used, such as might be provided using lamps or other more conventional illumination sources.

Exemplary projection apparatus described in the present disclosure and shown in the examples of FIGS. 1, 3, 4, 5, and 7 form a color image from three primary colors, red, green, and blue. It should be noted that the apparatus and methods of the present invention can be extended to display apparatus that use different sets of primary colors, including apparatus that use four or more colors for forming images. It should also be understood that the phase compensation method of the present invention is not restricted to use in the visible spectrum. It can for example, be used in a multi-channel visible and infrared, or infrared only, imaging system.

The invention has been described in detail with particular reference to certain preferred embodiments thereof, but it will be understood that variations and modifications can be effected within the spirit and scope of the invention. For example, the arrangement of dichroic elements that are used to form beam combiner 40 and provide phase difference compensation in single pass, can be varied from that shown in FIGS. 1 and 4 and may include thin film dichroic coatings formed not only on plate glass surfaces, but also coatings that are formed on optical surfaces that are embedded or immersed in glass or other transparent medium, to form optical prisms, including X-prisms, V-prisms, or Philips prisms. Although the method of the present invention is described with reference to a beam combiner 40, similar techniques could be applied for the design of a beam separator apparatus. Thus beam combiner 40 can be thought of more generally as a multi-color channel, multi-dichroic beam directing assembly, which can be used as a beam separator, a beam combiner, or both (double pass). It should also be noted that the system drawings are not drawn to scale, but are illustrative of key components and principles used in these embodiments.

Figure 19:
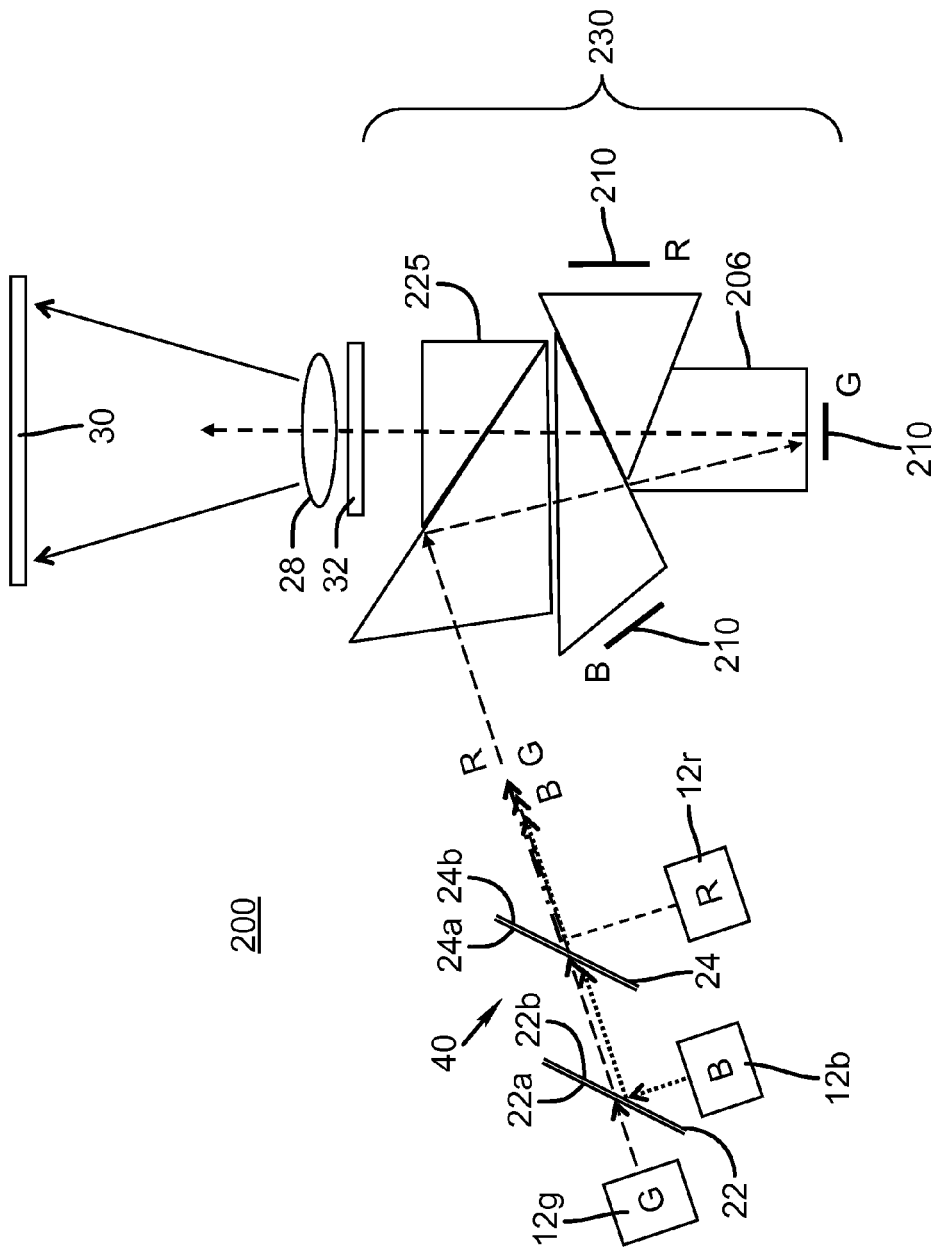
FIG. 19 is a schematic block diagram that shows the color combiner used with an imaging apparatus that employs a Philips prism in one embodiment.

In an alternate embodiment, the beam combiner 40 of the present invention can be used with other types of light separating and combining components for various types of imaging devices. The schematic diagram of FIG. 19 shows an embodiment of an imaging apparatus 200 that uses beam combiner 40 to provide polychromatic light from laser or other solid-state, narrow-band sources to a modulation optical system 230 including a TIR (total internal reflection) prism 225, a Philips prism 206, and spatial light modulators 210 (such as DLP). In this embodiment, color channels 12r, 12g, and 12b provide illumination to the TIR prism 225 that directs the combined polychromatic polarized light for image modulation to a Philips prism 206. This illuminating polarized light may be modulated by a polarization switching device (not shown) that switches polarization states several times per image frame. The illumination light is also made optically uniform by one or more homogenizers (not shown). The Philips prism 206 then separates the incident polychromatic light back into its component colors and directs each color to the corresponding spatial light modulator 210, in a manner familiar to those skilled in the electronic projection arts. The light is modulated by spatial light modulators 210 and is then recombined within Philips prism 206 and directed back toward TIR prism 225 and to polarization analyzer 32 and projection lens 28, which projects the light onto display surface 30.

Figure 20:
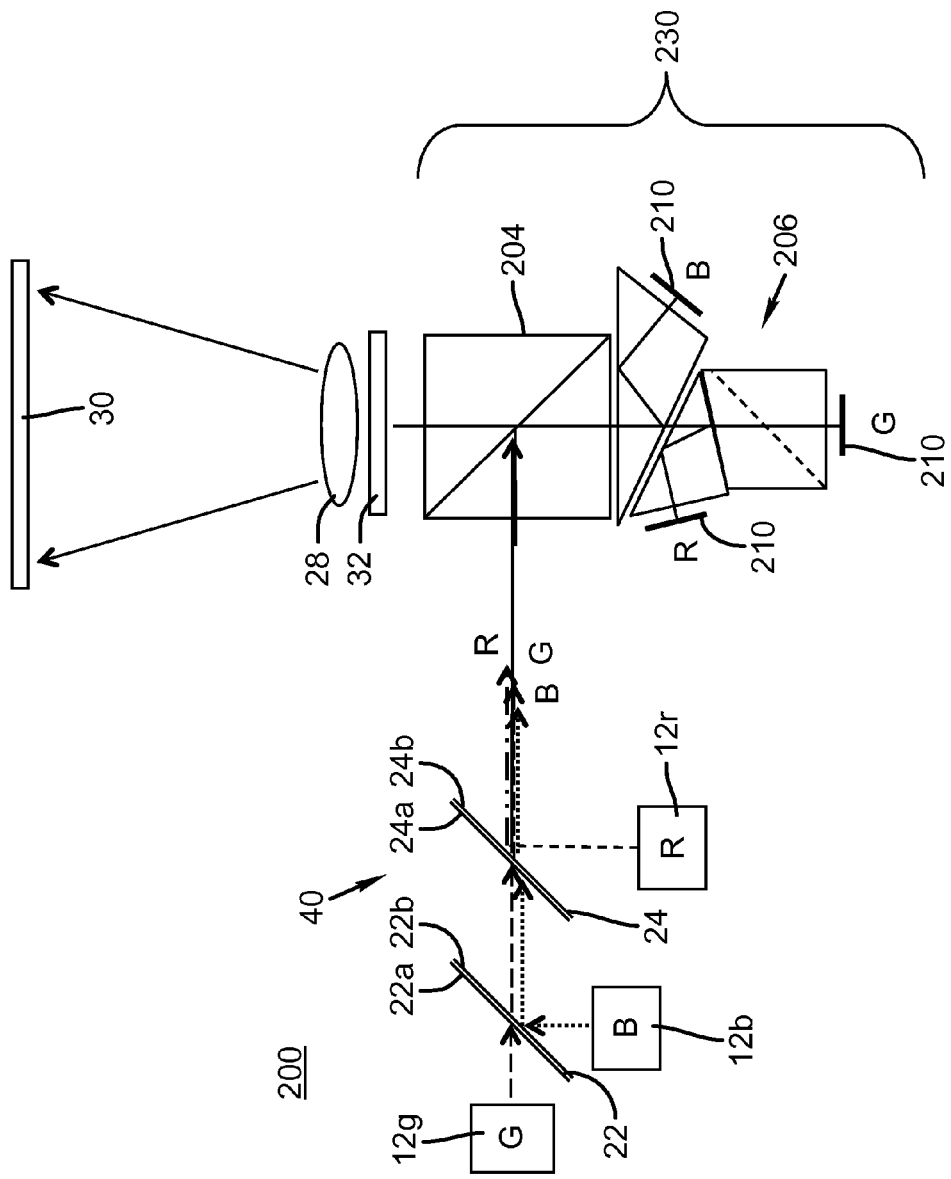
FIG. 20 is a schematic block diagram that shows the color combiner used with an imaging apparatus that employs a Philips prism in another embodiment.
Figure 21:
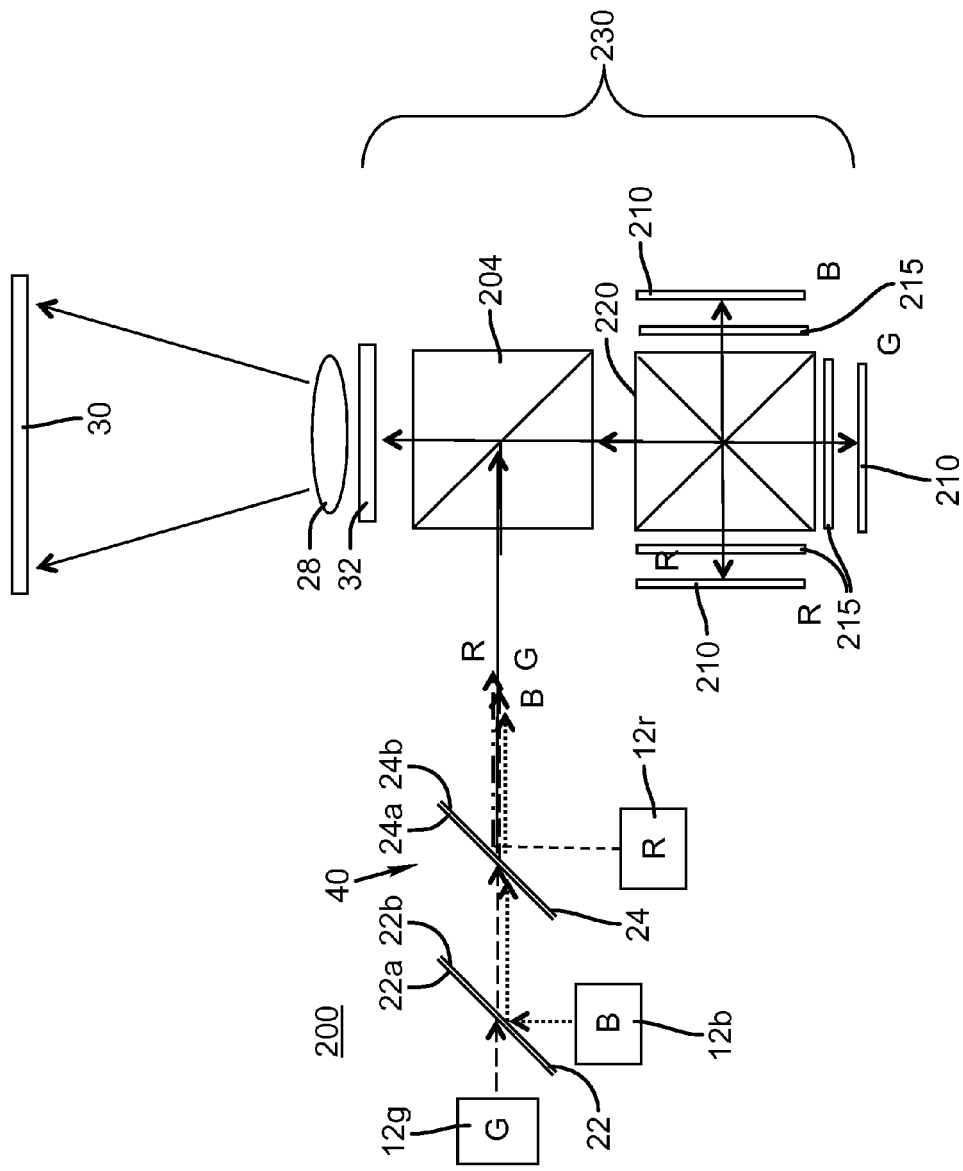
FIG. 21 is a schematic block diagram that shows the color combiner used with an imaging apparatus that employs an X-prism in one embodiment.

The schematic diagram of FIG. 20 shows another alternate embodiment of imaging apparatus 200 in which beam combiner 40 is used in similar fashion, as is the Philips Prism 206. However, in this case, the illumination light is directed within the modulation optical system 230, via a polarization beam splitter 204 and Philips prism 206. The polarization beam splitter 204 is shown as a MacNeille prism, but other devices, such as wire grid polarization beam splitters, can be used. The schematic diagram of FIG. 21 shows another alternate embodiment of imaging apparatus 200, where the illumination is provided to spatial light modulators 210 through an X-cube or X-prism 220. In either embodiment, the spatial light modulators 210 can be LCD or LCOS devices. Polarization compensators 215 can also be included; for example, to correct for retardance variations from the spatial light modulators 210.

As previously, the imaging apparatuses of FIGS. 19, 20, and 21 are assumed to need phase compensation to improve image quality, for example, for the purposes of 3D projection. Therefore phase differences $\Delta\phi$ need to be reduced or compensated for, as the imaging light transits beam combiner 40 and modulation optical system 230. Thus, it should be understood that the phase correction design methods of the present invention can be applied to the not only to the beam combiner 40, which is used in single pass configuration, as shown in FIG. 19 or 20, but also to the design of the coatings (dichroic or AR) of the modulation optical system 230. For example, the optical thin film coatings of Philips prism 206 or X-prism 220 can include coating structures that provide appropriate edge transitions outside the transiting illumination spectra to provide phase difference compensation. It should be understood that the phase difference compensation methods of the present invention can be used with prisms such as the Philips prism 206 or the X-prism 220 in double pass configurations as shown in FIGS. 19 and 20, without relying upon the double pass symmetry phase compensation methods described in the aforementioned article "Correction of Contrast in Projection Systems By Means of Phase-Controlled Prism Coatings and Band-Shifted Twist Compensators" by Rosenbluth et al.

The coatings design approach described herein is also applicable to a beam splitter in an alternate embodiment, such as polarization beam splitter 204 in FIG. 20, for example. The beam splitter would have a first surface having a multilayer thin-film stack, wherein the surface is disposed to transmit light of a first wavelength band along an optical path and to reflect light of a second wavelength band onto the optical path. The beam splitter would also have a phase difference compensation multilayer thin-film stack formed on either the first surface or on a second surface that is disposed along the optical path and that is configured to provide a reflective edge transition that lies outside the first or second wavelength bands. The compensation methods of the present invention can also be applied to a polarization analyzer 32 or to the plano (unstructured) surface of a wire grid polarization beam splitter.

In conclusion, the present invention provides phase difference $\Delta\phi$ compensation using thin films structures, such as notch filters or pass edge filters, that are incorporated with either dichroic or AR coatings on a component. The thin film structures provide edge transitions outside the spectra of light transiting the component, but which provide phase difference profiles associated with the edge transition that compensate for phase differences within the transiting spectra. The apparatus and methods of the present invention can be applied in either single-pass or double-pass mode through the optical components. This is distinct from earlier projection systems that attempt to compensate for polarization phase differences $\Delta\phi$ by designing the prism coatings to collectively remove the rotational component of depolarization by relying on phase cancellation by the symmetry of a double-pass geometry of color separation and recombination. Additionally, the present invention provides phase compensation within pass bands 42P of the primary dichroic elements 41, without having to disadvantageously trade away light efficiency (reflectivity or transmissivity) at spectral bands of interest.

It should be noted that the apparatus and method of the present invention deliberately construct reflective multilayer stack structures at wavelengths near those provided by the narrow-band laser or other solid-state sources. Because of this, the apparatus and method of the present invention are not as suitable for use with imaging apparatus that separate polychromatic white light, such as light from an arc lamp, into component color bands and then modulate the light over each band, as it is difficult to provide phase compensation to 10 degrees or less, for broad spectral bands. Such systems use broadband light, chiefly in order to obtain all of the light possible for projection. As has been shown in FIGS. 19 and 20, however, embodiments of the present invention can be used with imaging apparatus architectures that use conventional color separation and recombination using polarization beam splitters and either X-prisms, Philips prisms or Plumbicon devices, or other color combiners that employ an arrangement of dichroic surfaces and handle light from lasers or other solid-state light sources.

Advantageously, embodiments of the present invention help to reduce the phase difference over conventional color combiner and color splitter devices that employ multilayer thin-film coatings. Additional throughput gains have also been noted. For example, in one embodiment using the basic dichroic filter arrangement of FIG. 4, the phase difference over the green channel was reduced from 20 degrees to within ±0.5 degrees, with almost 5 degrees improvement in the blue channel and similar improvements in the red channel. This improvement in phase difference was accompanied by a measurable light efficiency increase, with a gain of at least 5% in the green channel and smaller, but significant improvements for blue and red channels.

Exemplary embodiments of the present invention described herein have used reflective multifilm stacks added to surfaces of a dichroic beam combiner, shown in these examples as beam combiner 40. It should be noted that compensation for phase difference A can alternately be provided on a variety of optical elements in the optical path, including lenses, glass plates, mirrors, filters, prisms, polarizers, and other structures. In addition, as has been described with reference to FIGS. 19 and 20, the same compensation strategy is applicable for coatings in embodiments that employ conventional Philips prism and X-prism color separators and combiners.

PARTS LIST 12r, 12g, 12b Color channel
22, 23, 24 Dichroic element
22a, 23a, 24a Anti-reflection surface
22b, 23b, 24b Filter surface
28 Projection lens
30 Display surface
32 Polarization analyzer
40 Beam combiner
41 Primary dichroic element
42 Reflectance profile
42E Edge transition
42P Pass band
42R Rejection band
43, 44, 45 Dichroic element
43a, 44a, 45a Anti-reflection surface
43b, 44b, 45b Filter surface
46L, 46R, 47L, 47R, 48L, 48R, 49L, 49R Box
50, 50c Phase difference profile 51, 51c Phase tails
52 Phase compensating dichroic element
53r, 54r, 55r Reflection filter graph
53t, 54t, 55t Transmission filter graph
53φ, 54φ, 55φ, 56φ, 57φ Phase difference graph
60, 61 Phase compensating spectral bandpass
62r, 63r, 64r Reflection filter graph
62t, 63t, 64t Transmission filter graph
62φ, 63φ, 64φ, 66φ, 67φ Phase difference graph
80 Optical element
82 Incident light
84 Plane of incidence
86 Reflected light
92, 94 Dichroic element
92a, 94a Anti-reflection surface
92b, 94b Filter surface
100, 101 Imaging apparatus
110, 111, 112, 113, 114, 115 Phase difference profile
118 Phase tails
120, 122, 124, 130, 132, 134, 140, 142, 144, 146 Graph
150, 152, 154, 160, 162, 164, 170, 172, 174, 176 Graph
200 Imaging apparatus
204 Polarization beam splitter
206 Phillips prism
210 Spatial light modulator
215 Polarization compensator
220 X-prism
225 TIR prism
230 Modulation optical system
S110 Initial design step
S120 Phase assessment step
S130 Second design step
S140 Second phase assessment step
S150 Phase compensation step

The invention claimed is:

1. An anti-reflective thin film coating formed on an optical surface, comprising a multilayer thin-film stack arranged to suppress reflection of incident polarized light within an incident light wavelength range, wherein the multilayer thin-film stack further provides a reflectance edge transition at a wavelength band that lies outside the incident light wavelength range, and wherein the reflectance edge transition is arranged to provide phase difference compensation to the polarized light within the incident polarized light wavelength range.

2. The anti-reflective thin film coating of claim 1 wherein the reflectance edge transition is located within less than 100 nm of the incident light wavelength range.

3. The anti-reflective thin film coating of claim 1 wherein the phase difference compensation provides phase differences of less than ±10 degrees.

4. The anti-reflective thin film coating of claim 1 wherein the phase difference compensation is provided with a phase difference performance based on parameters including the number of thin film layers, the refractive indices of the thin film layers, the ratio of the refractive indices of the thin film layers, the spectral position of edge transitions, or combinations thereof.

5. The anti-reflective thin film coating of claim 1 wherein the edge transition provides a change in reflectance between ≦5% reflectivity and ≧80% reflectivity in a narrow bandwidth of ≦30 nm.

6. The anti-reflective thin film coating of claim 1 wherein the provided phase difference compensation compensates for phase differences accumulated from one or more other optical elements.

7. The anti-reflective thin film coating of claim 6 wherein the other optical elements include at least one dichroic element having a dichroic coating.

8. The anti-reflective thin film coating of claim 7 wherein the dichroic coating is a bandpass filter coating or a pass edge filter coating.

* * * * *